US012322344B2

(12) United States Patent
Wang et al.

(10) Patent No.: US 12,322,344 B2
(45) Date of Patent: Jun. 3, 2025

(54) DISPLAY APPARATUS

(71) Applicant: BOE Technology Group Co., Ltd., Beijing (CN)

(72) Inventors: Lirong Wang, Beijing (CN); Fei Yang, Beijing (CN); Jingbo Xu, Beijing (CN); Fang Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/916,049

(22) PCT Filed: Nov. 29, 2021

(86) PCT No.: PCT/CN2021/134130

§ 371 (c)(1),
(2) Date: Jun. 1, 2023

(87) PCT Pub. No.: WO2023/092596

PCT Pub. Date: Jun. 1, 2023

(65) Prior Publication Data

US 2024/0212624 A1 Jun. 27, 2024

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/08* (2013.01); *G09G 2330/021* (2013.01)

(58) Field of Classification Search
CPC ............... G09G 3/3266; G09G 3/3275; G09G 2310/08; G09G 2330/021
See application file for complete search history.

(56) References Cited

U.S. PATENT DOCUMENTS

2008/0238844 A1 10/2008 Kakiuchi et al.
2010/0148829 A1 * 6/2010 Hong .................. G09G 3/3648 327/108

(Continued)

FOREIGN PATENT DOCUMENTS

CN 1841482 A 10/2006
CN 101276565 A 10/2008

(Continued)

*Primary Examiner* — Ryan A Lubit
(74) *Attorney, Agent, or Firm* — Ling Wu; Stephen Yang; Ling and Yang Intellectual Property

(57) ABSTRACT

Provided is a display apparatus including a display panel, a timing controller, a source driver and a gate driver. The display apparatus is divided into a first region and a second region along a centerline. The timing controller includes a first timing connector and a second timing connector, which are located in the same region with the gate driver, and the first timing connector is located on a side of the second timing connector close to the gate driver. The first timing connector is configured to transmit a first signal, which includes a first power supply signal configured to supply power to the gate driver and a first control signal configured to control the gate driver to output a scan signal. The second timing connector is configured to transmit a second signal, which includes a second control signal configured to control the source driver to output a data signal.

17 Claims, 13 Drawing Sheets

(56) References Cited

U.S. PATENT DOCUMENTS

2014/0078190 A1* 3/2014 Wu .......................... H05K 3/36
29/831
2014/0085281 A1* 3/2014 Lim ..................... G09G 3/3266
345/206
2014/0176412 A1 6/2014 Oh
2015/0206509 A1 7/2015 Moh et al.
2016/0133178 A1* 5/2016 Oh ....................... G09G 3/2092
345/208
2016/0189614 A1 6/2016 Tani et al.
2018/0039107 A1 2/2018 Sasaki et al.
2018/0040268 A1 2/2018 Murai
2020/0175912 A1* 6/2020 Lee ...................... G09G 3/3233
2021/0049956 A1* 2/2021 Yeh ........................ G09G 5/008
2021/0383749 A1* 12/2021 Yeh .......................... G09G 3/32
2022/0343831 A1 10/2022 Li et al.
2023/0061612 A1* 3/2023 Liu ...................... G09G 3/3688

FOREIGN PATENT DOCUMENTS

CN 101303840 A 11/2008
CN 101751886 A 6/2010
CN 103366666 A 10/2013
CN 103680384 A 3/2014
CN 103903546 A 7/2014
CN 105590576 A 5/2016
CN 105741784 A 7/2016
CN 107430837 A 12/2017
CN 107703650 A 2/2018
CN 111613186 A 9/2020

* cited by examiner

DISPLAY APPARATUS

CROSS-REFERENCE TO RELATED APPLICATION

The present application is a U.S. National Phase Entry of International PCT Application No. PCT/CN2021/134130, having an international filing date of Nov. 29, 2021, the entire content of which is hereby incorporated by reference.

TECHNICAL FIELD

The present disclosure relates to, but is not limited to, the field of display technology, and more particularly, to a display apparatus.

BACKGROUND

An Organic Light Emitting Diode (OLED for short) and a Quantum dot Light Emitting Diode (QLED for short) are active light emitting display apparatuses and have advantages of self-luminescence, a wide viewing angle, a high contrast ratio, low power consumption, an extremely high response speed, lightness and thinness, flexibility, and a low cost, etc. With constant development of display technologies, a flexible display that uses an OLED or a QLED as a light emitting device and performs signal control by a Thin Film Transistor (TFT for short) has become a mainstream product in the field of display at present.

SUMMARY

The following is a summary of subject matters described herein in detail. The summary is not intended to limit the protection scope of claims.

In a first aspect, the present disclosure provides a display apparatus including a display panel, a timing controller, a source driver, and a gate driver; the display panel includes: a first boundary and a second boundary which are oppositely disposed and a third boundary and a fourth boundary which are oppositely disposed, the gate driver is located on a side of the first boundary away from the second boundary and/or on a side of the second boundary away from the first boundary, the source driver is located on a side of the third boundary away from the fourth boundary or on a side of the fourth boundary away from the third boundary, the display apparatus is divided into a first region and a second region along a centerline of the display apparatus, and the centerline of the display apparatus extends in a same direction as the extension of the first boundary and intersects the extension of the third boundary;

the timing controller includes a first timing connector and a second timing connector, wherein the first timing connector, the second timing connector and the gate driver are located in the same region, and the first timing connector is located on a side of the second timing connector close to the gate driver;

the first timing connector is configured to transmit a first signal, the second timing connector is configured to transmit a second signal, the first signal includes: a first power supply signal and a first control signal, the first power supply signal is configured to supply power to the gate driver, the first control signal is configured to control the gate driver to output a scan signal, and the second signal includes a second control signal, which is configured to control the source driver to output a data signal.

In some possible implementations, it further includes at least one printed circuit board and multiple flexible circuit boards, wherein the source driver is located on the flexible circuit board or the display panel;

the printed circuit board is located between the flexible circuit board and the timing controller and is connected to the timing controller and at least one flexible circuit board;

the flexible circuit board is located between the printed circuit board and the display panel and is connected to the display panel.

In some possible implementations, the first timing connector is further configured to transmit a third signal, which includes a second power supply signal configured to supply power to the display panel.

In some possible implementations, the second timing connector is further configured to transmit a fourth signal, which includes a clock embedded differential signal protocol.

In some possible implementations, when the quantity of gate drivers is one, the gate driver is located in the first region or the second region; and the timing controller and the gate driver are located in a same region of the display apparatus.

In some possible implementations, when the quantity of gate drivers is two, the two gate drivers are respectively located in the first region and the second region; and the timing controller is located in the first region and the second region and is substantially symmetrical along a centerline of the display apparatus.

In some possible implementations, the quantity of the first timing connector and the second timing connector are both one; and the first timing connector and the second timing connector are located on a side of the timing controller close to the display panel.

In some possible implementations, the quantity of the printed circuit boards is one, and the printed circuit boards is substantially symmetrical along a centerline of the display apparatus;

the printed circuit board includes a first circuit connector and a second circuit connector, wherein the first circuit connector, the second circuit connector and the gate driver are located in a same region of the display apparatus, and the first circuit connector is located on a side of the second circuit connector close to the gate driver;

the first circuit connector and the second circuit connector are located on a side of the printed circuit board close to the timing controller; and the first timing connector is connected to the first circuit connector, and the second timing connector is connected to the second circuit connector.

In some possible implementations, the quantity of the first timing connectors and the second timing connectors are both two;

two first timing connectors are substantially symmetrical along a centerline of the display apparatus, two second timing connectors are substantially symmetrical along a centerline of the display apparatus, and two second timing connectors are located between the two first timing connectors; and the first timing connector and the second timing connector are located on a side of the timing controller close to the display panel.

In some possible implementations, the quantity of the printed circuit boards is two, the two printed circuit boards are substantially symmetrical along a centerline of the display apparatus, and the two printed circuit boards are respectively a first printed circuit board and a second printed circuit board; at least one printed circuit board includes a first circuit connector and a second circuit connector;

a first printed circuit board, a first first timing connector and a first second timing connector are located in the first region, and a second printed circuit board, a second first timing connector and a second second timing connector are located in the second region;

for at least one printed circuit board, the first circuit connector is located on a side of the second circuit connector away from a centerline of the display apparatus, the first circuit connector and the second circuit connector are located on a side of the printed circuit board close to the timing controller;

a first circuit connector of a first printed circuit board is connected to a first first timing connector, a second circuit connector of a first printed circuit board is connected to a first second timing connector, a first circuit connector of a second printed circuit board is connected to a second first timing connector, and a second circuit connector of a second printed circuit board is connected to a second second timing connector.

In some possible implementations, for a first timing connector and a second timing connector located in a same region, when the amount of data that may be transmitted by the second timing connector is less than a sum of the amount of data of a second signal and the amount of data of a fourth signal, the second timing connector is configured to transmit a first signal segment, and the first timing connector is configured to transmit a second signal segment; and the second signal includes a first signal segment and a second signal segment, the data amount of the first signal segment is smaller than the data amount of the second signal segment.

In some possible implementations, the display panel includes multiple sub-pixels, wherein at least one sub-pixel includes a drive circuit including a drive transistor;

the first timing connector or the second timing connector is further configured to transmit a fifth signal, which includes at least one of a gamma reference voltage signal, a third power supply signal, a compensation control signal, and a compensation data signal; wherein the third power supply signal is configured to supply power to the source driver, the compensation control signal is configured to control compensation for a threshold voltage and mobility of a drive transistor, and the compensation data signal is configured as a data signal for compensating for a threshold voltage and mobility of the drive transistor.

In some possible implementations, the timing controller further includes a third timing connector, which is disposed between the first timing connector and the second timing connector;

the third timing connector is configured to transmit a fifth signal, which includes at least one of a gamma reference voltage signal, a third power supply signal, a compensation control signal, and a compensation data signal; wherein the third power supply signal is configured to supply power to the source driver, the compensation control signal is configured to control compensation for a threshold voltage and mobility of a drive transistor, and the compensation data signal is configured as a data signal for compensating for a threshold voltage and mobility of the drive transistor.

In some possible implementations, the quantity of the first timing connector, the second timing connector, and the third timing connector is each two;

two first timing connectors are substantially symmetrical along a centerline of the display apparatus, two second timing connectors are substantially symmetrical along a centerline of the display apparatus, two third timing connectors are substantially symmetrical along a centerline of the display apparatus, two second timing connectors and two third timing connectors are located between the two first timing connectors, and two second timing connectors are located between the two third timing connectors; and the first timing connector, the second timing connector, and the third timing connector are located on a side of the timing controller close to the display panel.

In some possible implementations, the quantity of the printed circuit boards is four, and the four printed circuit boards are respectively a first printed circuit board, a second printed circuit board, a third printed circuit board, and a fourth printed circuit board;

the first printed circuit board and the second printed circuit board are located in the first region, and the third printed circuit board and the fourth printed circuit board are located in the second region; the first printed circuit board is located on a side of the second printed circuit board away from a centerline of the display apparatus, and the fourth printed circuit board is located on a side of the third printed circuit board away from a centerline of the display apparatus;

a first first timing connector, a first second timing connector and a first third timing connector are located in the first region, and a second first timing connector, a second second timing connector and a second third timing connector are located in the second region;

for a second printed circuit board and a third printed circuit board, the second printed circuit board and the third printed circuit board include: a first circuit connector, a second circuit connector, and a third circuit connector, wherein the third circuit connector is located between the first circuit connector and the second circuit connector, the first circuit connector is located on a side of the third circuit connector away from a centerline of the display apparatus, and the second circuit connector is located on a side of the third circuit connector close to a centerline of the display apparatus;

a first circuit connector of the second printed circuit board is connected to a first first timing connector, a second circuit connector of the second printed circuit board is connected to a first second timing connector, a third circuit connector of the second printed circuit board is connected to a first third timing connector, a first circuit connector of the third printed circuit board is connected to a second first timing connector, a second circuit connector of the third printed circuit board is connected to a second second timing connector, and a third circuit connector of the third printed circuit board is connected to a second third timing connector.

In some possible implementations, the second printed circuit board and the third printed circuit board further include a fourth circuit connector and a fifth circuit connector; the fourth circuit connector is located on a side of the fifth circuit connector away from a centerline of the display apparatus;

the fourth circuit connector transmits the same signal as the third circuit connector, and the fifth circuit connector transmits the same signal as the first circuit connector;

the first printed circuit board and the fourth printed circuit board include a first circuit connector and a second circuit connector;

for the first printed circuit board and the fourth printed circuit board, the first circuit connector is located on a side of the second circuit connector away from a centerline of the display apparatus;

a first circuit connector of the first printed circuit board is connected to a fifth circuit connector of the second printed circuit board, a second circuit connector of the first printed circuit board is connected to a fourth circuit connector of the second printed circuit board, a first circuit connector of the fourth printed circuit board is connected to a fifth circuit connector of the third printed circuit board, and a second circuit connector of the fourth printed circuit board is connected to a fourth circuit connector of the third printed circuit board.

In some possible implementations, the first timing connector is further configured to transmit a fourth signal and a sixth signal, wherein the sixth signal includes a third power supply signal.

In some possible implementations, the timing controller further includes a fourth timing connector configured to transmit a fourth signal and a sixth signal, wherein the sixth signal includes a third power supply signal.

In some possible implementations, the quantity of the first timing connector, the second timing connector, the third timing connector, and the fourth timing connector is each two;

two first timing connectors are substantially symmetrical along a centerline of the display apparatus, two second timing connectors are substantially symmetrical along a centerline of the display apparatus, two third timing connectors are substantially symmetrical along a centerline of the display apparatus, and two fourth timing connectors are substantially symmetrical along a centerline of the display apparatus; two second timing connectors, two third timing connectors and two fourth timing connectors are located between the two first timing connectors, two third timing connectors and two second timing connectors are located between the two fourth timing connectors, and two second timing connectors are located between the two third timing connectors;

the second timing connector and the third timing connector are located on a side of the timing controller close to the display panel, and the first timing connector and the fourth timing connector are located on adjacent sides of the surface on which the second timing connector is located.

In some possible implementations, the quantity of the printed circuit boards is four, and the four printed circuit boards are respectively a first printed circuit board, a second printed circuit board, a third printed circuit board, and a fourth printed circuit board;

the first printed circuit board and the second printed circuit board are located in the first region, and the third printed circuit board and the fourth printed circuit board are located in the second region; the first printed circuit board is located on a side of the second printed circuit board away from a centerline of the display apparatus, and the fourth printed circuit board is located on a side of the third printed circuit board away from a centerline of the display apparatus;

a first first timing connector, a first second timing connector, a first third timing connector and a first fourth timing connector are located in the first region, and a second first timing connector, a second second timing connector, a second third timing connector and a second fourth timing connector are located in the second region;

for at least one printed circuit board, the printed circuit board includes a first circuit connector and a second circuit connector, the first circuit connector is located on a side of the second circuit connector away from a centerline of the display apparatus;

a first circuit connector of the first printed circuit board is connected to a first first timing connector, and a second circuit connector of the first printed circuit board is connected to a first fourth timing connector;

a first circuit connector of the second printed circuit board is connected to a first third timing connector, and a second circuit connector of the second printed circuit board is connected to a first second timing connector;

a first circuit connector of the third printed circuit board is connected to a second first timing connector, and a second circuit connector of the third printed circuit board is connected to a second fourth timing connector;

a first circuit connector of the fourth printed circuit board is connected to a second third timing connector, and a second circuit connector of the fourth printed circuit board is connected to a second second timing connector.

In some possible implementations, for at least one printed circuit board, the printed circuit board further includes a third circuit connector;

the third circuit connectors in the second printed circuit board and the third printed circuit board are located on a side of the first circuit connector away from a centerline of the display apparatus;

the third circuit connectors in the first printed circuit board and the fourth printed circuit board are located on a side of the second circuit connector close to a centerline of the display apparatus;

a third circuit connector of the first printed circuit board is connected to a third circuit connector of the second printed circuit board; and a third circuit connector of the third printed circuit board is connected to a third circuit connector of the fourth printed circuit board.

In some possible implementations, the third circuit connector is configured to transmit a fifth signal.

In some possible implementations, the third timing connector is further configured to transmit a third signal.

Other aspects may be understood upon reading and understanding the drawings and the detailed description.

BRIEF DESCRIPTION OF DRAWINGS

The accompanying drawings are used for providing understanding of technical solutions of the present disclosure, and form a part of the specification. They are used for explaining the technical solutions of the present disclosure together with the implementations of the present disclosure, but do not form a limitation on the technical solutions of the present disclosure.

DETAILED DESCRIPTION

Figure 1:
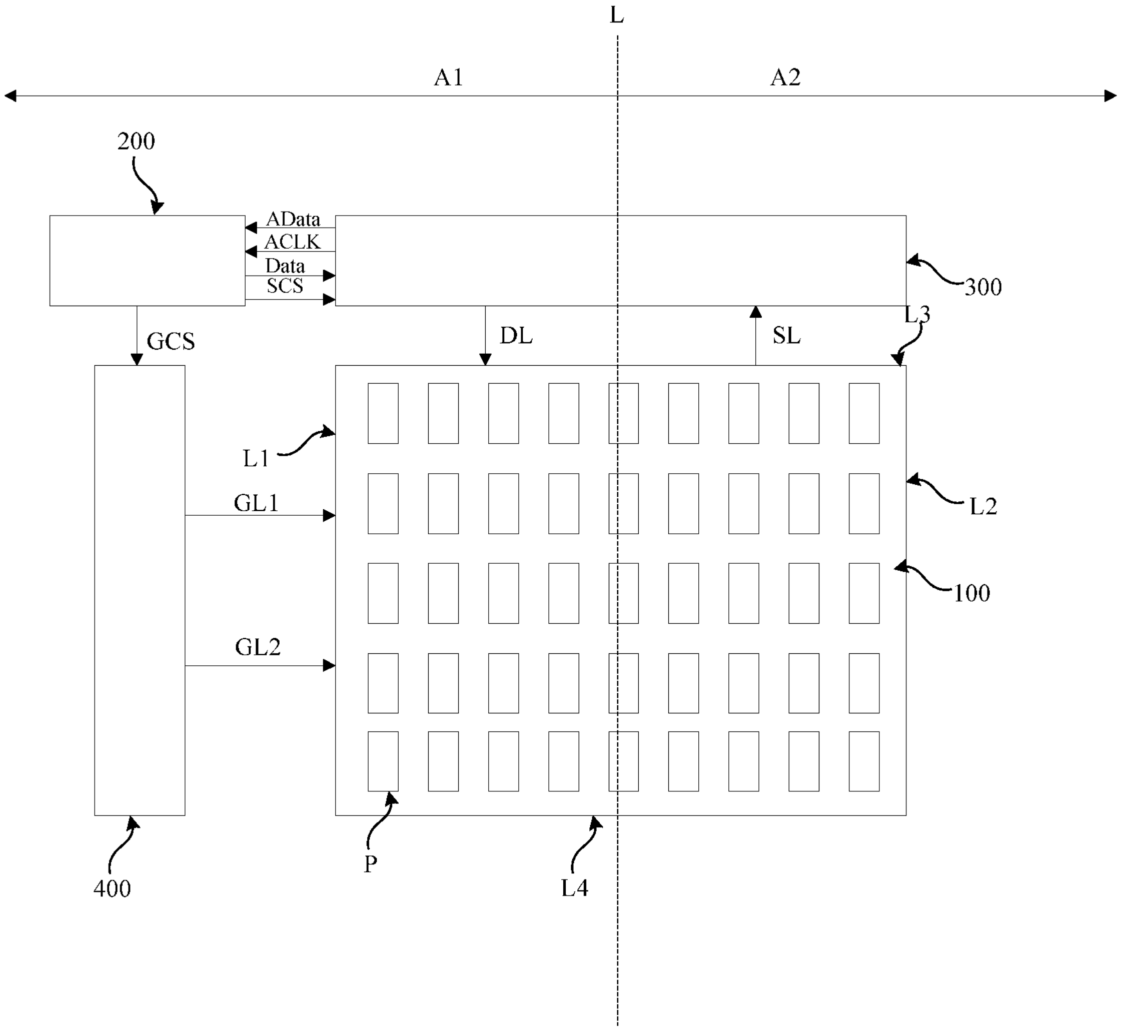
FIG. 1 is a schematic diagram of a structure of a display apparatus.

To make objectives, technical solutions, and advantages of the present disclosure clearer, the implementations of the present disclosure will be described in detail with reference to the accompanying drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The implementations in the present disclosure and features in the implementations may be combined randomly with each other without conflict. In order to keep following description of the implementations of the present disclosure clear and concise, detailed descriptions about part of known functions and known components are omitted in the present disclosure. The drawings of the implementations of the present disclosure only involve structures involved in the implementations of the present disclosure, and other structures may refer to usual designs.

In the drawings, a size of each constituent element, a thickness of a layer, or a region is exaggerated sometimes for clarity. Therefore, one mode of the present disclosure is not necessarily limited to the size, and shapes and sizes of various components in the drawings do not reflect actual scales. In addition, the drawings schematically illustrate ideal examples, and one implementation of the present disclosure is not limited to the shapes, numerical values, or the like shown in the drawings.

The ordinal numbers “first”, “second”, “third” and the like in this specification are used to avoid confusion between constituent elements, but not to constitute limitations on quantities.

In the specification, for convenience, wordings indicating directional or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be the drain electrode, and a second electrode may be the source electrode. Or, the first electrode may be the source electrode, and the second electrode may be the drain electrode. In cases that transistors with opposite polarities are used, a current direction changes during operation of a circuit, or the like, functions of the “source electrode” and the “drain electrode” are sometimes interchangeable. Therefore, the “source electrode” and the “drain electrode” are interchanged in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulating layer" sometimes.

In the present disclosure, "about" refers to that a boundary is defined not so strictly and numerical values within process and measurement error ranges are allowed.

For a display apparatus includes a display panel and a timing controller, the cost of the display apparatus is high due to the unreasonable arrangement of the timing controller.

Figure 2:
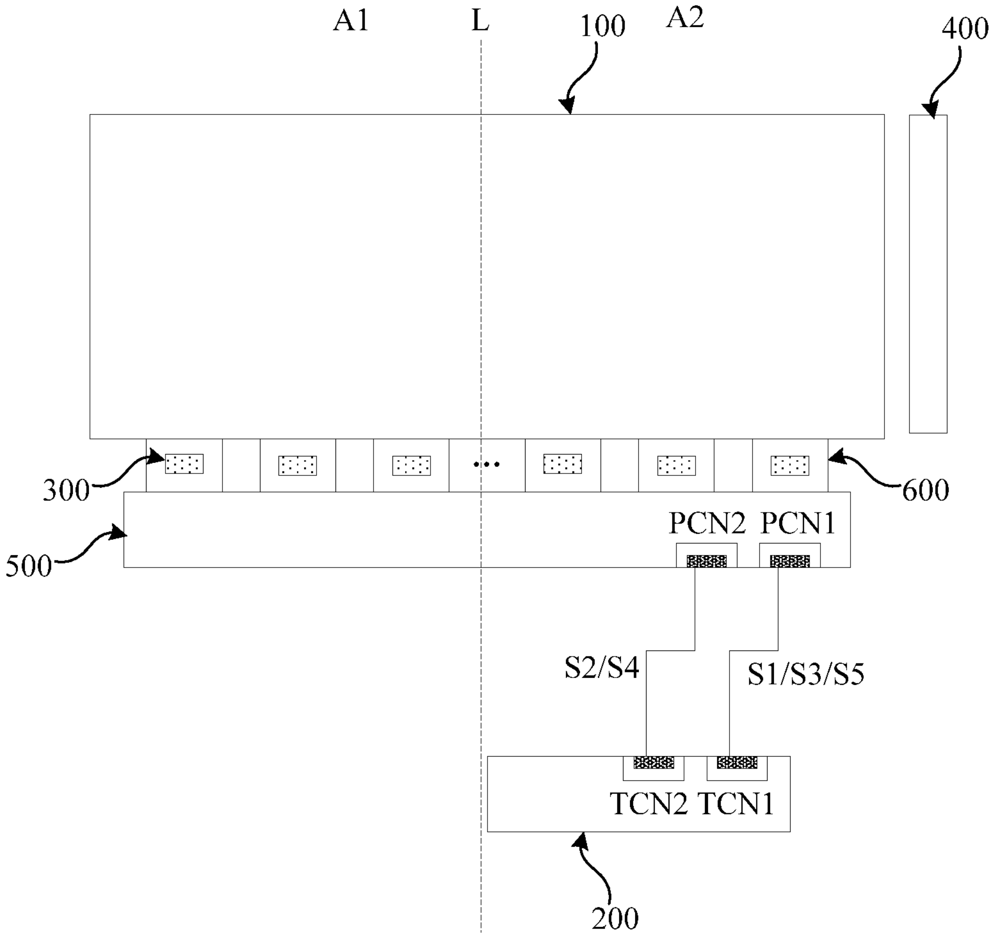
FIG. 2 is a schematic diagram of the connection between the timing controller and the display panel in the display apparatus provided by an exemplary implementation of the present disclosure.

FIG. 1 is a schematic diagram of a structure of a display apparatus. FIG. 2 is a schematic diagram of the connection between the timing controller and the display panel in the display apparatus provided by an exemplary implementation of the present disclosure. As shown in FIGS. 1 and 2, implementations of the present disclosure provide a display apparatus including a display panel 100, a timing controller 200, a source driver 300, and a gate driver 400. The display panel includes a first boundary L1 and a second boundary L2 which are oppositely disposed and a third boundary L3 and a fourth boundary L4 which are oppositely disposed. A gate driver 400 is located on a side of the first boundary L1 away from the second boundary L2 and/or on a side of the second boundary L2 away from the first boundary L1. A source driver 300 is located on a side of the third boundary L3 away from the fourth boundary L4 or on a side of the fourth boundary L4 away from the third boundary L3. The display apparatus is divided into a first region A1 and a second region A2 along a centerline L of the display apparatus, and the centerline L of the display apparatus extends in the same direction as the extension direction of the first boundary L1, which intersects the extension direction of the third boundary L3. FIG. 1 is illustrated with a gate driver 400 located on a side of the first boundary L1 away from the second boundary L2 and a source driver located on a side of a third boundary L3 away from the fourth boundary L4. FIG. 2 is illustrated with a gate driver 400 located on a side of the second boundary L2 away from the first boundary L1 and a source driver located on a side of the fourth boundary L4 away from the third boundary L3.

In an exemplary implementation, a timing controller 200 may include a first timing connector TCN1 and a second timing connector TCN2. The first timing connector TCN1, the second timing connector TCN2 and the gate driver 400 are located in a same region, and the first timing connector TCN1 is located on a side of the second timing connector TCN2 close to the gate driver 400.

In an exemplary implementation, a first timing connector TCN1 may be configured to transmit a first signal S1. The first signal S1 may include a first power supply signal which may be configured to supply power to a gate driver and a first control signal which may be configured to control the gate driver to output a scan signal.

In an exemplary implementation, a second timing connector TCN2 is configured to transmit a second signal S2. Wherein, the second signal includes a second control signal configured to control a source driver to output a data signal.

In one exemplary implementation, the display apparatus may be, for example, a mobile terminal, television, monitor, laptop, digital photo frame, navigator, electronic paper, or any other product or component with a display function.

In an exemplary implementation, in a display phase, a timing controller 200 generates a first data signal DATA, a source control signal SCS, and a gate control signal GCS through a compensation algorithm based on externally inputted multicolor data (e.g. RGB data), a timing control signal, and a received sense data signal.

In an exemplary implementation, a timing controller may provide signals to a source driver through a mini low voltage differential signal interface.

In an exemplary implementation, a first control signal is a gate control signal and a second control signal is a source control signal.

In an exemplary implementation, a first control signal may include a Start Vertical (STV) of a gate, a Clock Pulse Vertical (CPV) of the gate, and an Output Enable (OE) of the gate.

In an exemplary implementation, a second control signal may include a source start pulse, a source shift clock, and a source output enable signal.

In an exemplary implementation, a timing controller 200 transmits a first data signal DATA and a source control signal SCS to a source driver 300 and a gate control signal GCS to a gate driver 400.

In an exemplary implementation as shown in FIG. 1, a source driver 300 is configured to receive a first data signal DATA transmitted by a timing controller 200. Here, the first data signal DATA1 may be generated by a timing controller based on externally inputted multicolor data (for example, red, green and blue (RGB) data), a timing control signal, and a received sense data signal.

In an exemplary implementation, a first data signal DATA may carry a control command and at least one display data signal.

In an exemplary implementation, a second control signal may include a first data signal DATA.

In an exemplary implementation, a source driver 300 is further configured to convert each display data signal into a data voltage signal (i.e., a gray scale signal) and transmit the converted data voltage signal to a corresponding data line DL.

In an exemplary implementation, a source driver 300 is further configured to simultaneously transmit a reference clock signal ACLK and a sense data signal ADATA to a timing controller 200 under the control of the control command carried by a first data signal DATA1, so that the timing controller 200 receives the sense data signal ADATA under the control of the reference clock signal ACLK. For example, the timing controller may receive the sense data signal ADATA on a rising edge or a falling edge of the reference clock signal ACLK. Wherein, the sense data signal ADATA is obtained by analog-to-digital conversion of the analog voltage signal from the sense line SL by the source driver 300.

In an exemplary implementation, a sense data signal ADATA may reflect an optical characteristic (e.g. an start voltage of an OLED) or an electrical characteristic (e.g. a threshold voltage of a drive transistor) of a sub-pixel in the display panel.

In an exemplary implementation, a source driver 300 is further configured to generate a reference clock signal based on a clock frequency of the reference clock signal. For example, the first data signal DATA may carry the clock frequency of the reference clock signal.

In an exemplary implementation, a source driver 300 is further configured to receive a base clock signal transmitted by a timing controller 200; the clock frequency of the reference clock signal may be determined according to the base clock signal. The clock frequency of the base clock signal is the clock frequency of the reference clock signal.

In an exemplary implementation, a base clock signal may be a TTL (transistor-transistor-logic) signal or a differential signal.

In an exemplary implementation, the source driver 300 receives a first data signal carrying control command, and under the control of the control command, the source driver 300 simultaneously transmits the reference clock signal and the sense data signal to the timing controller. In this manner, the timing controller 200 can receive the sense data signal in time under the control of the reference clock signal, thereby improving the accuracy of the sense data signal received by the timing controller 200.

In an exemplary implementation, the timing controller 200 may differentially transmit the first data signal DATA to the source driver 300.

In an exemplary implementation, the source driver 300 may differentially transmit the reference clock signal ACLK and the sense data signal ADATA to the timing controller 200. Transmitting signals in a differential manner can improve the speed of signal transmission and the accuracy of the sense data signal received by the timing controller.

In an exemplary implementation, the source driver 300 may include a data parser, a clock generator, and an analog-to-digital converter. The data parser is configured to parse the control command from the first data signal DATA and transmit the control command to the clock signal generator and the analog-to-digital converter. The clock signal generator is configured to generate a reference clock signal according to a clock frequency of the reference clock signal and to transmit the reference clock signal to a timing controller under control of a control command.

In an exemplary implementation, the data parser is further configured to parse at least one display data signal DATA from the first data signal DATA1. The digital-to-analog converter is configured to convert at least one display data signal DATA into an analog voltage signal under the control of a source control signal transmitted by a timing controller, and to transmit the converted analog voltage signal to a corresponding data line DL. For example, at least one display data signal DATA includes 10 display data signals DATA. After each display data signal DATA is converted into an analog voltage signal, the converted analog voltage signals are respectively transmitted to corresponding data lines DL, such as DL1, DL2 . . . DL10.

In an exemplary implementation, a source driver 300 is further configured to receive a base clock signal transmitted by a timing controller, and the clock signal generator may determine the clock frequency of the reference clock signal based on the base clock signal In an exemplary implementation, an analog-to-digital converter is configured to convert an analog voltage signal from a sense line into a sense data signal ADATA (digital signal) and to transmit the sense data signal ADATA to a timing controller under control of a control command.

In an exemplary implementation, the clock signal generator transmits the reference clock signal to the timing controller at the same time as the analog-to-digital converter transmits the sense data signal ADATA to the timing controller. For example, the control command carries the signal transmission trigger time, and the clock signal generator starts timing after receiving the control command, and transmits the reference clock signal to the timing controller when the timing reaches the signal transmission trigger time. Similarly, the analog-to-digital converter starts timing after receiving the control command CM, and transmits the sense data signal ADATA to the timing controller when the timing reaches the signal transmission trigger time.

In an exemplary implementation, the display panel may be an OLED display panel or a QLED display panel, and the present disclosure does not limit this in any way.

The display apparatus provided by the implementation of the present disclosure includes a display panel, a timing controller, a source driver and a gate driver; the display panel includes: a first boundary and a second boundary which are oppositely disposed and a third boundary and a fourth boundary which are oppositely disposed, the gate driver is located on a side of the first boundary away from the second boundary and/or on a side of the second boundary away from the first boundary, the source driver is located on a side of the third boundary away from the fourth boundary or on a side of the fourth boundary away from the third boundary, the display apparatus is divided into a first region and a second region along a centerline of the display apparatus, and the centerline of the display apparatus extends in a same direction as the extension of the first boundary and intersects the extension of the third boundary. The timing controller includes a first timing connector and a second timing connector, wherein the first timing connector, the second timing connector and the gate driver are located in the same region, and the first timing connector is located on a side of the second timing connector close to the gate driver. The first timing connector is configured to transmit a first signal, the second timing connector is configured to transmit a second signal. The first signal includes: a first power supply signal and a first control signal, wherein the first power supply signal is configured to supply power to the gate driver, and the first control signal is configured to control the gate driver to output a scan signal. The second signal includes a second control signal, which is configured to control the source driver to output a data signal. A connector for supplying a signal to a gate driver in a timing controller in a display apparatus provided by an implementation of the present disclosure is close to the gate drive and a connector for supplying a signal to a source driver is close to the source driver. A first timing connector, a second timing connector and the gate driver are located in the same region, thereby optimizing the layout of the connector of the timing controller and saving the cost of the timing controller and the display apparatus.

In an exemplary implementation, as shown in FIG. 1, the display panel may include a pixel array. Wherein, the pixel array includes: multiple sub-pixels P. Wherein, at least one sub-pixel may include a data line DL, a sense line SL, two gate lines GL1 and GL2, a pixel drive circuit, and a light emitting device.

In an exemplary implementation, a light emitting device may be an OLED device or a QLED device.

Figure 3A:
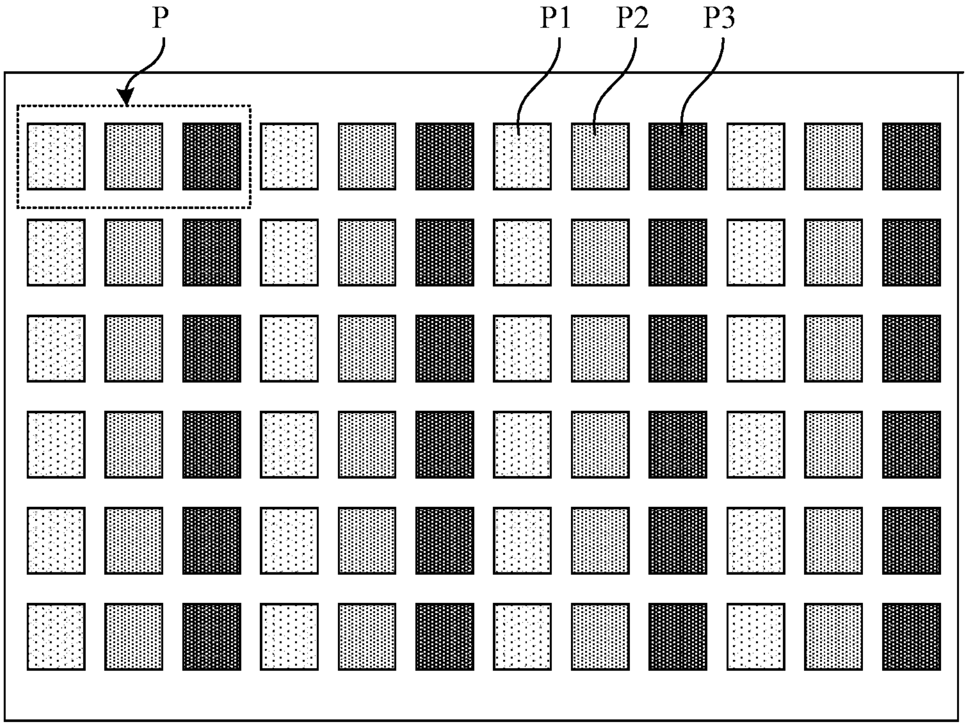
FIG. 3A is a schematic diagram of a planar structure of a display panel.
Figure 3B:
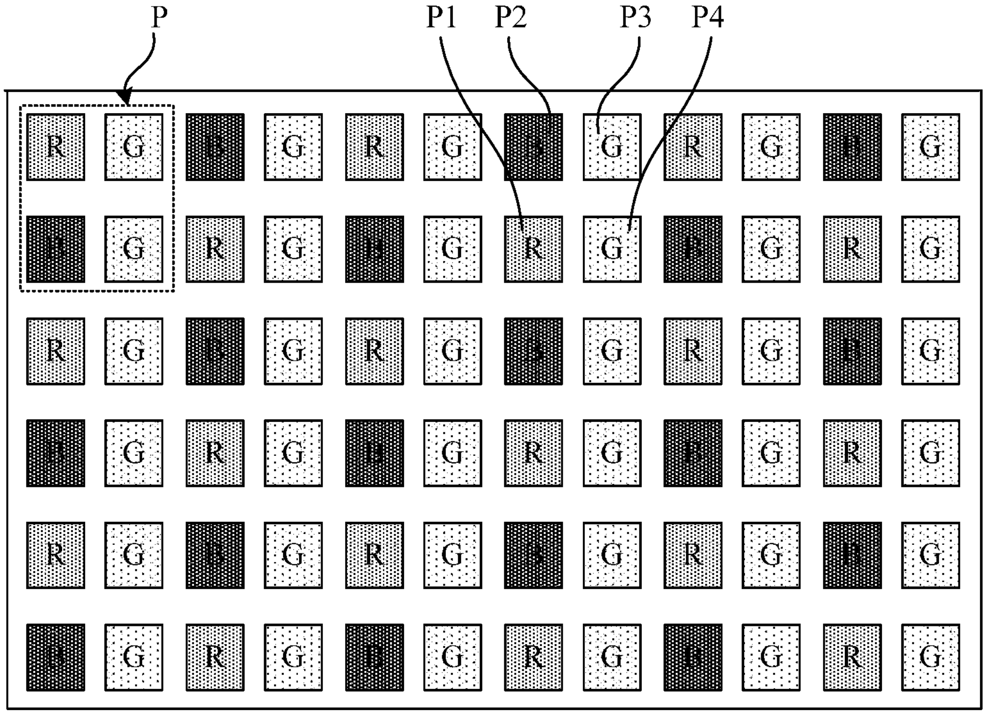
FIG. 3B is another schematic diagram of a planar structure of a display panel.

FIG. 3A is a schematic diagram of a planar structure of a display panel. FIG. 3B is another schematic diagram of a planar structure of a display panel. As shown in FIGS. 3A and 3B, the display panel may include multiple pixel units P arranged in a matrix, at least one of the multiple pixel units P includes a first sub-pixel P1 emitting a first color light, a second sub-pixel P2 emitting a second color light, and a third sub-pixel P3 emitting a third color light. Or, at least one of the multiple pixel units P includes a first sub-pixel P1 emitting first color light, a second sub-pixel P2 emitting second color light, a third sub-pixel P3 emitting third color light, and a fourth sub-pixel P4. FIG. 3A illustrates that the pixel unit P includes a first sub-pixel P1 that emits light of a first color, a second sub-pixel P2 that emits light of a second color, and a third sub-pixel P3 that emits light of a third color. FIG. 3B illustrates that a pixel unit includes, for example, a first sub-pixel P1 emitting a first color light, a second sub-pixel P2 emitting a second color light, and a third sub-pixel P3 and a fourth sub-pixel P4 emitting a third color light.

In an exemplary implementation, the first sub-pixel P1, the second sub-pixel P2, the third sub-pixel P3 and the fourth sub-pixel P4 all include a pixel drive circuit and a light emitting device. The pixel drive circuit in the first sub-pixel P1, the second sub-pixel P2, the third sub-pixel P3 and the fourth sub-pixel P4 are respectively connected to the gate line and the data line. The pixel drive circuit is configured to, under the control of the gate line, receive the data voltage transmitted by the data line, and output a corresponding current to the light emitting device.

In an exemplary implementation, the light emitting devices in the first sub-pixel P1, the second sub-pixel P2, the third sub-pixel P3, and the fourth sub-pixel P4 are respectively connected to the pixel drive circuits of the sub-pixels where the light emitting devices are located. The light emitting device is configured to emit light with a corresponding brightness in response to a current output by the pixel drive circuit of the sub-pixel where the light emitting device is located.

In an exemplary implementation, a pixel unit P may include a Red (R) sub-pixel, a Green (G) sub-pixel, and a Blue (B) sub-pixel, or may include a red sub-pixel, a green sub-pixel, a blue sub-pixel, and a white sub-pixel, which is not limited in the present disclosure. In an exemplary implementation, the sub-pixels in the pixel unit may be rectangular, rhombic, pentagonal or hexagonal in shape. When the pixel unit includes three sub-pixels, the three sub-pixels may be arranged side by side horizontally, side by side vertically, or in a form of delta, and when the pixel unit includes four sub-pixels, the four sub-pixels may be arranged side by side horizontally, side by side vertically, or in a shape of a square, which is not limited in the present disclosure.

Figure 4:
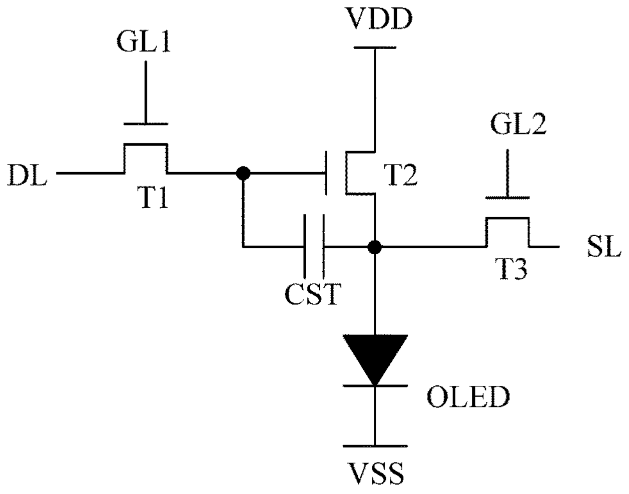
FIG. 4 is a schematic diagram of an equivalent circuit of a pixel drive circuit.

FIG. 4 is a schematic diagram of an equivalent circuit of a pixel drive circuit. As shown in FIG. 4, in an exemplary implementation, the pixel drive circuit has a 3T1C structure and may include a storage capacitor CST, a switch transistor T1, a drive transistor T2, and a sense transistor T3. The anode voltage of the light emitting device may be VDD, and the cathode voltage of the OLED may be ELVSS. Optical or electrical eigenvalues of sub-pixels may be obtained by using the sense line SL.

In an exemplary implementation, the first transistor T1 is a switch transistor, the second transistor T2 is a drive transistor, and the third transistor T3 is a sense transistor. A gate electrode of the first transistor T1 is coupled to a first gate line GL1, a first electrode of the first transistor T1 is coupled to a data line DL, and a second electrode of the first transistor T1 is coupled to a gate electrode of the second transistor T2. The first transistor T1 is used for receiving the data signal transmitted by the data line DL under the control of the first gate line Gn, so that the gate electrode of the second transistor T2 receives the data signal. The gate electrode of the second transistor T2 is coupled to the second electrode of the first transistor T1, a first electrode of the second transistor T2 is coupled to the first power supply line VDD, a second electrode of the second transistor T2 is coupled to a first electrode of an OLED, and the second transistor T2 is configured to generate a corresponding current at the second electrode under the control of the data signal received by the gate electrode of the second transistor. A gate electrode of the third transistor T3 is coupled to the second gate line GL2, a first electrode of the third transistor T3 is connected to the sense line SL, a second electrode of the third transistor T3 is coupled to the second electrode of the second transistor T2. The third transistor T3 is configured to extract a threshold voltage Vth and the mobility of the second transistor T2 in response to compensation timing to compensate the threshold voltage Vth. The first electrode of the OLED is coupled to the second electrode of the second transistor T2, a second electrode of the OLED is coupled to the second power supply line VSS, and the OLED is configured to emit light with corresponding brightness in response to the current of the second electrode of the second transistor T2. A first electrode of the storage capacitor CST is coupled to the gate electrode of the second transistor T2, a second electrode of the storage capacitor CST is coupled to the second electrode of the second transistor T2, and the storage capacitor CST is configured to store a potential of the gate electrode of the second transistor T2.

In an exemplary implementation, a signal of the first power supply line VDD is a high-level signal continuously provided, and a signal of the second power supply line VSS is a low-level signal. The first transistor T1 to the third transistor T3 may be P-type transistors or may be N-type transistors. Use of a same type of transistors in a pixel drive circuit may simplify a process flow, reduce process difficulties of a display panel, and improve a product yield.

In an exemplary implementation, the first transistor T1 to the third transistors T3 may adopt low temperature polysilicon thin film transistors, or oxide thin film transistors, or low temperature polysilicon thin film transistors and oxide thin film transistors. An active layer of a low temperature poly silicon thin film transistor is made of Low Temperature Poly Silicon (LTPS for short), and an active layer of an oxide thin film transistor is made of an oxide. The low temperature poly silicon thin film transistor has advantages of a high mobility, fast charging, and the like, and the oxide thin film transistor has advantages of a low leakage current and the like. In an exemplary implementation, a low temperature poly silicon thin film transistor and an oxide thin film transistor may be integrated on one display panel to form a Low Temperature Polycrystalline Oxide (LTPO for short) display panel, so that advantages of the two may be utilized, high Pixel Per Inch (PPI for short) and low-frequency drive may be achieved, power consumption may be reduced, and display quality may be improved.

In an exemplary implementation, the light emitting device may be an Organic light emitting Diode (OLED), including a first electrode (anode), an organic light emitting layer, and a second electrode (cathode) that are stacked.

Figure 5:
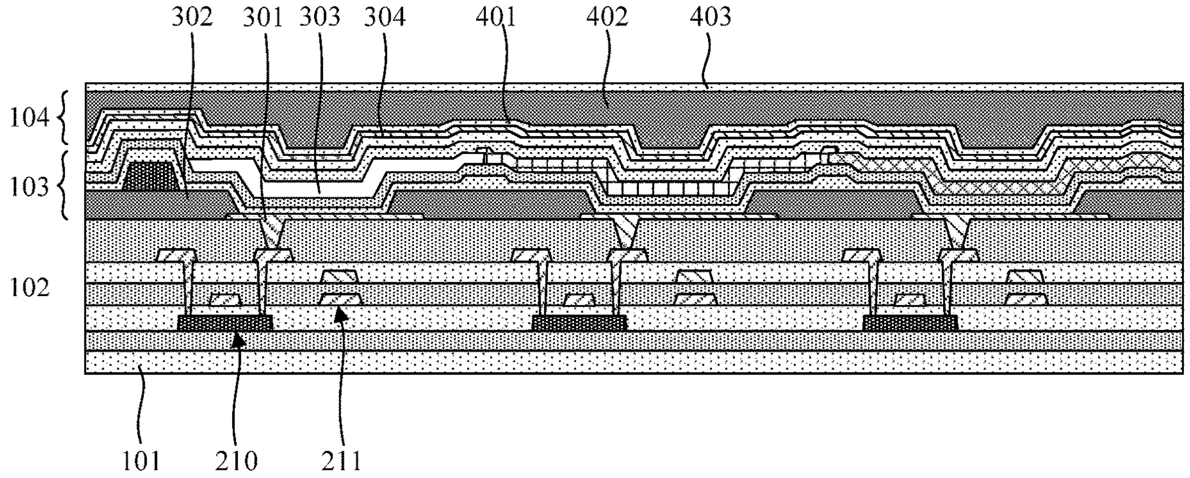
FIG. 5 is a schematic diagram of a sectional structure of a display panel.

FIG. 5 is a schematic sectional view of a display panel, which illustrates a structure of three sub-pixels of the OLED display panel. Referring to FIG. 5, on a plane perpendicular to the display substrate, the display substrate may include a drive circuit layer 102 disposed on a substrate 101, a light emitting structure layer 103 disposed on a side of the drive circuit layer 102 away from the substrate 101, and an encapsulation layer 104 disposed on a side of the light emitting structure layer 103 away from the substrate 101. In some possible implementation modes, the display panel may include another film layer, such as a post spacer, which is not limited here in the present disclosure.

In an exemplary implementation, the base substrate 101 may be a flexible base substrate, or may be a rigid base substrate. A drive circuit layer 102 of each sub-pixel may include multiple transistors and a storage capacitor that form a pixel drive circuit. FIG. 5 shows only one transistor 101 and one storage capacitor 101A as an example. The light emitting structure layer 103 may include an anode 301, a pixel define layer 302, an organic light emitting layer 303, and a cathode 304. The anode 301 is connected to a drain electrode of a drive transistor 210 through a via. The organic light emitting layer 303 is connected to the anode 301. The cathode 304 is connected to the organic light emitting layer 303. The organic light emitting layer 303 is driven by the anode 301 and the cathode 304 to emit light of a corresponding color. The encapsulation layer 104 may include a first encapsulation layer 401, a second encapsulation layer 402, and a third encapsulation layer 403 that are stacked, wherein the first encapsulation layer 401 and the third encapsulation layer 403 may be made of an inorganic material, the second encapsulation layer 402 may be made of an organic material, and the second encapsulation layer 402 is arranged between the first encapsulation layer 401 and the third encapsulation layer 403 so as to prevent external water vapor from entering the emitting structure layer 103.

In an exemplary implementation, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary implementation, hole injection layers of all sub pixels may be connected together to form a common layer, electron injection layers of all the sub pixels may be connected together to form a common layer, hole transport layers of all the sub pixels may be connected together to form a common layer, electron transport layers of all the sub pixels may be connected together to form a common layer, hole block layers of all the sub pixels may be connected together to form a common layer, emitting layers of adjacent sub pixels may be overlapped slightly, or may be isolated from each other, and electron block layers of adjacent sub pixels may be overlapped slightly, or may be isolated from each other.

Figure 6:
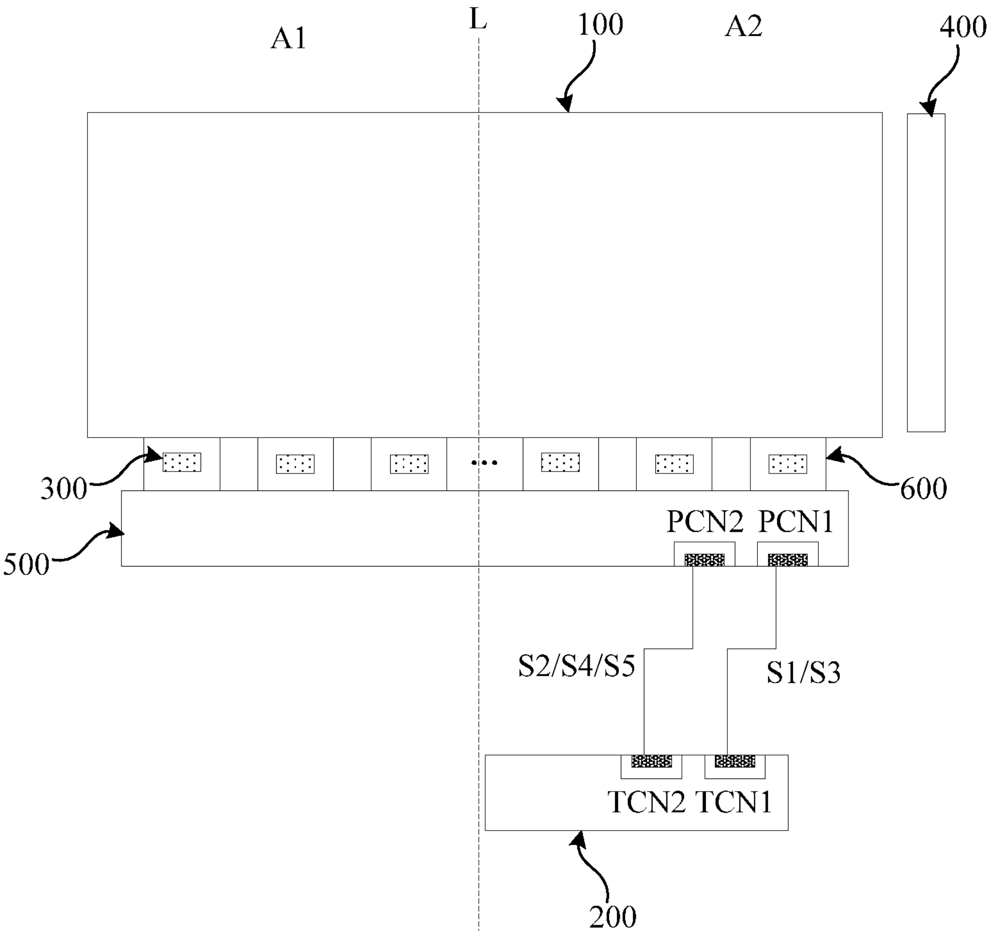
FIG. 6 is a first schematic diagram of the connection between the timing controller and the display panel in the display apparatus provided by an exemplary implementation.
Figure 7:
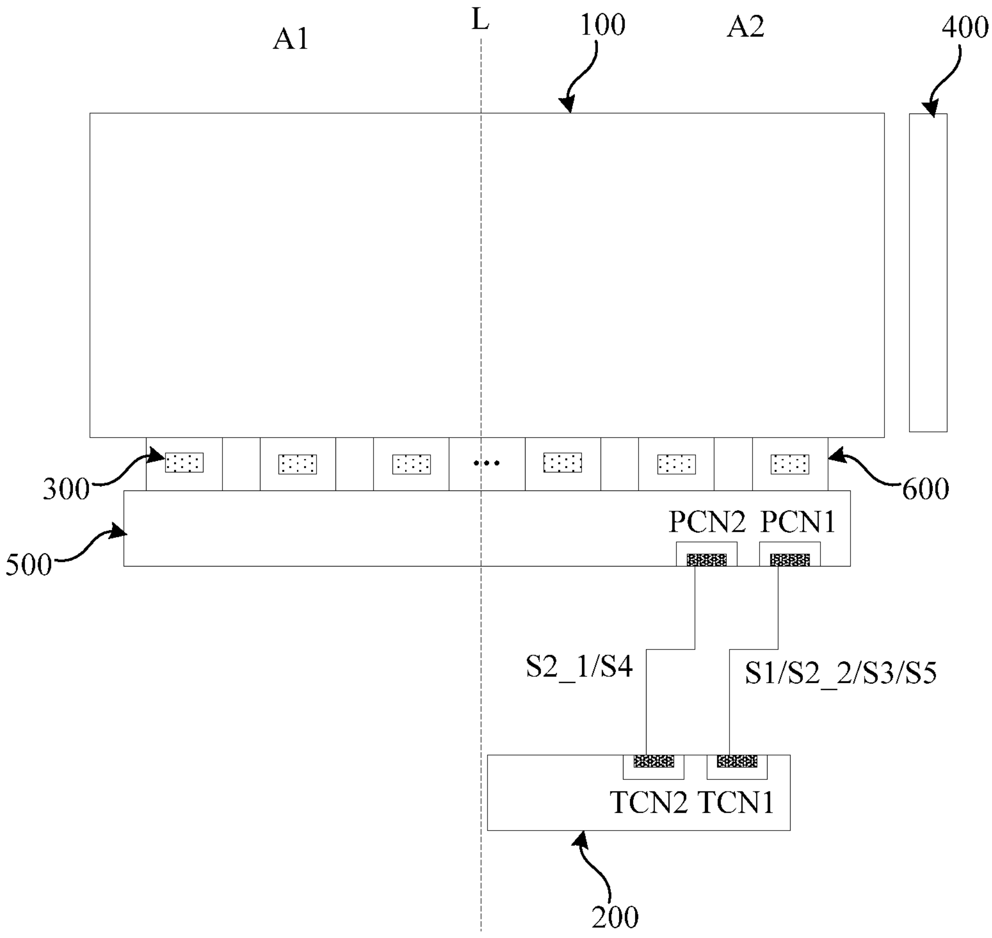
FIG. 7 is a second schematic diagram of the connection between the timing controller and the display panel in the display apparatus provided by an exemplary implementation.
Figure 8:
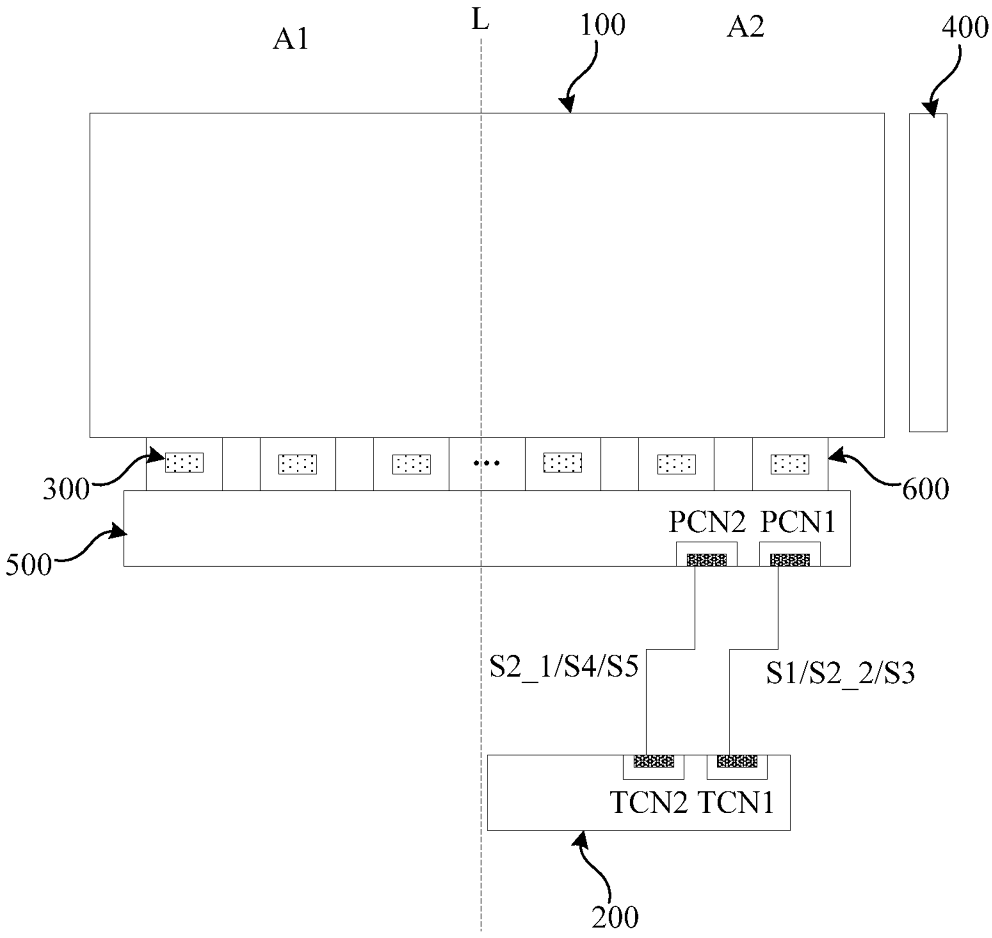
FIG. 8 is a third schematic diagram of the connection between the timing controller and the display panel in the display apparatus provided by an exemplary implementation.
Figure 9:
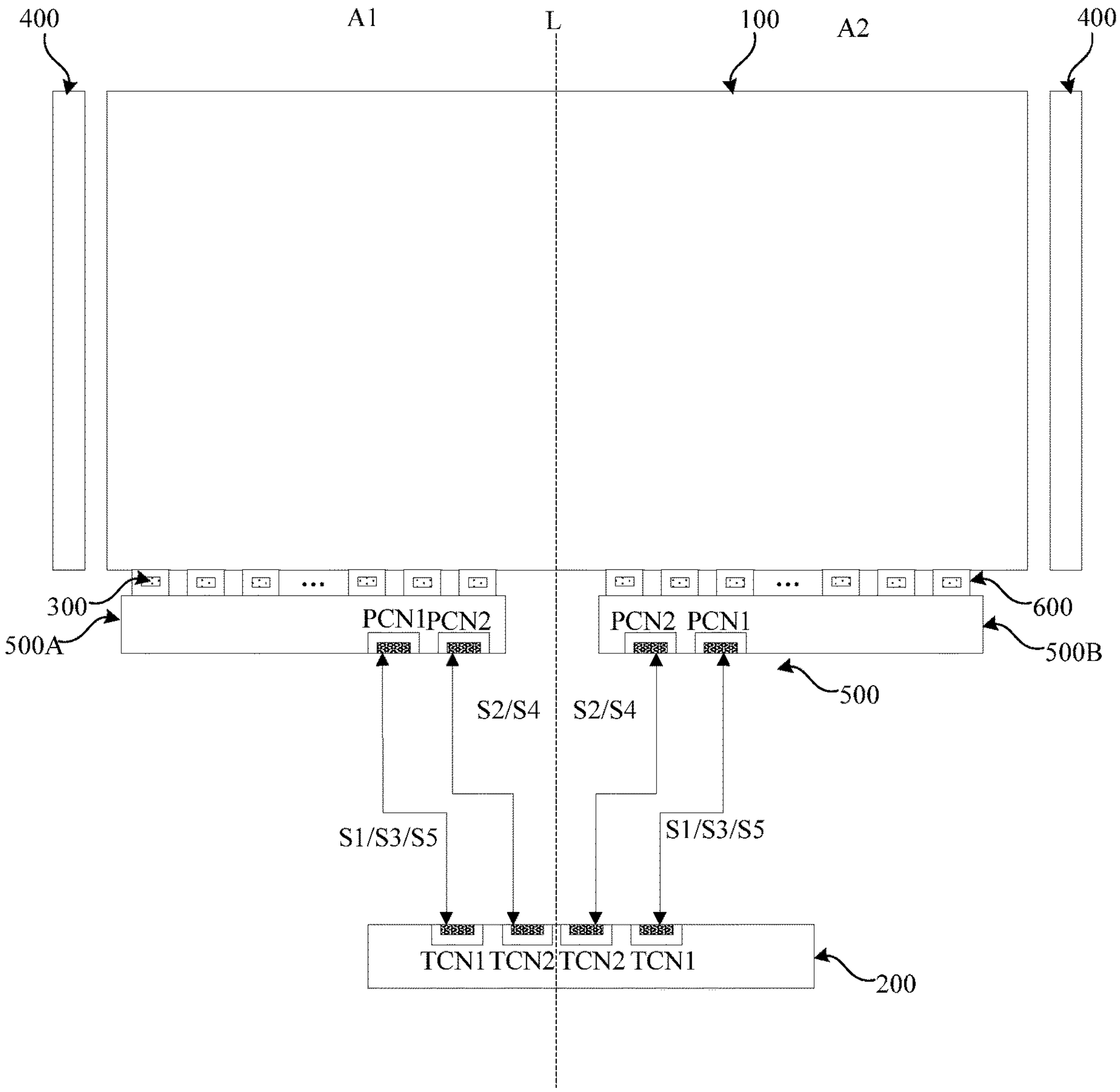
FIG. 9 is a fourth schematic diagram of the connection between the timing controller and the display panel in the display apparatus provided by an exemplary implementation.
Figure 10:
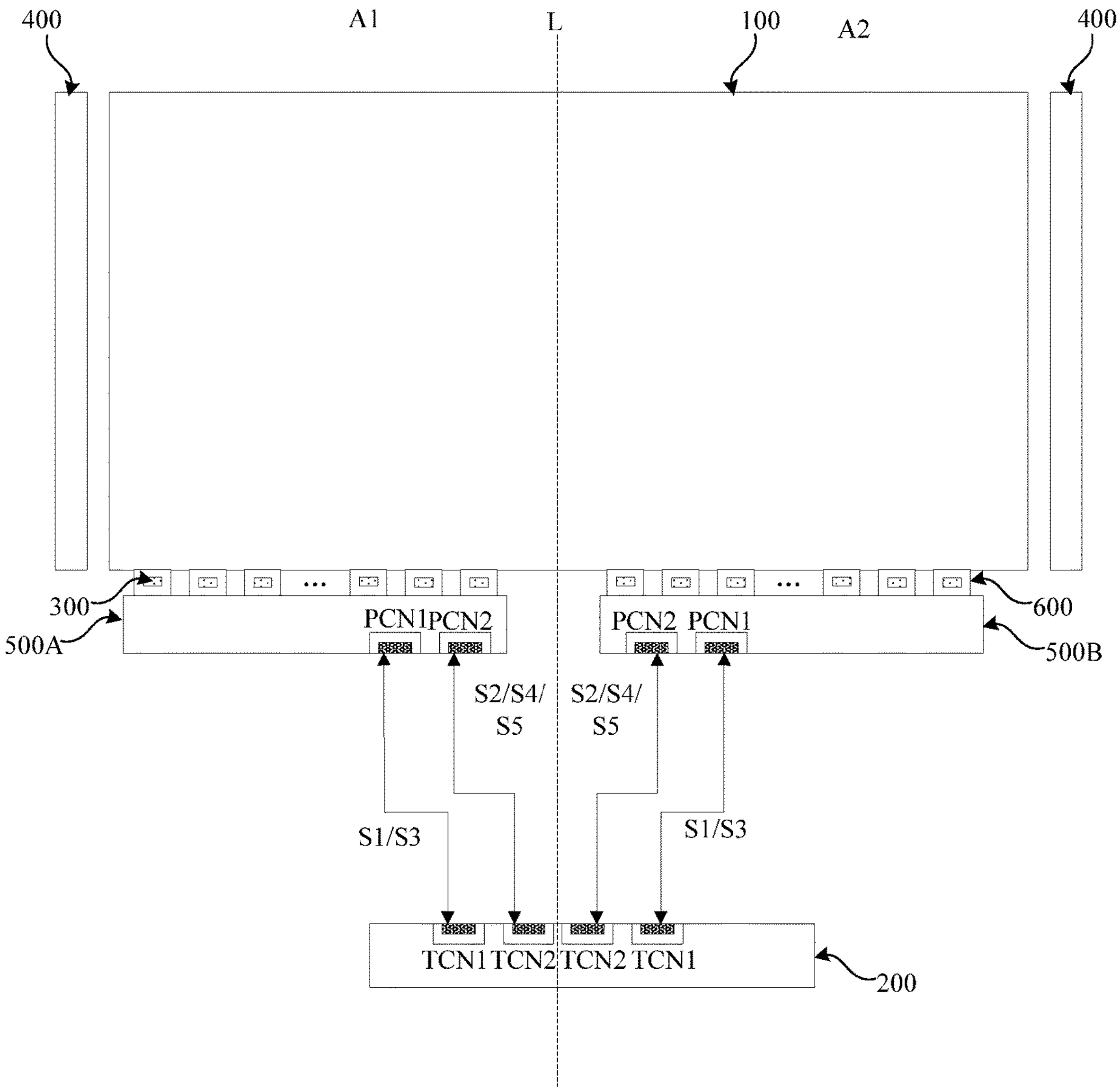
FIG. 10 is a fifth schematic diagram of the connection between the timing controller and the display panel in the display apparatus provided by an exemplary implementation.
Figure 11:
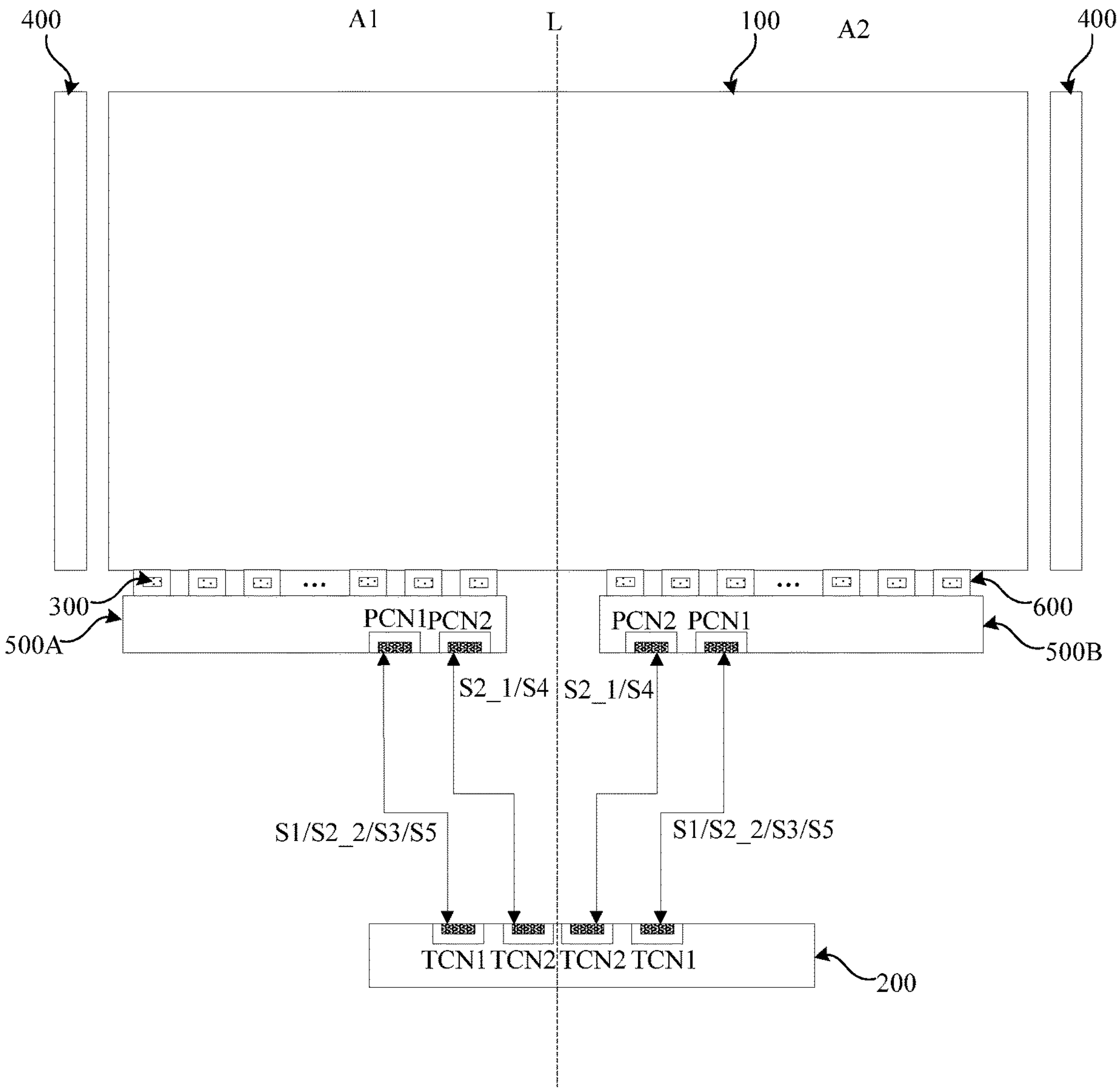
FIG. 11 is a sixth schematic diagram of the connection between the timing controller and the display panel in the display apparatus provided by an exemplary implementation.
Figure 12:
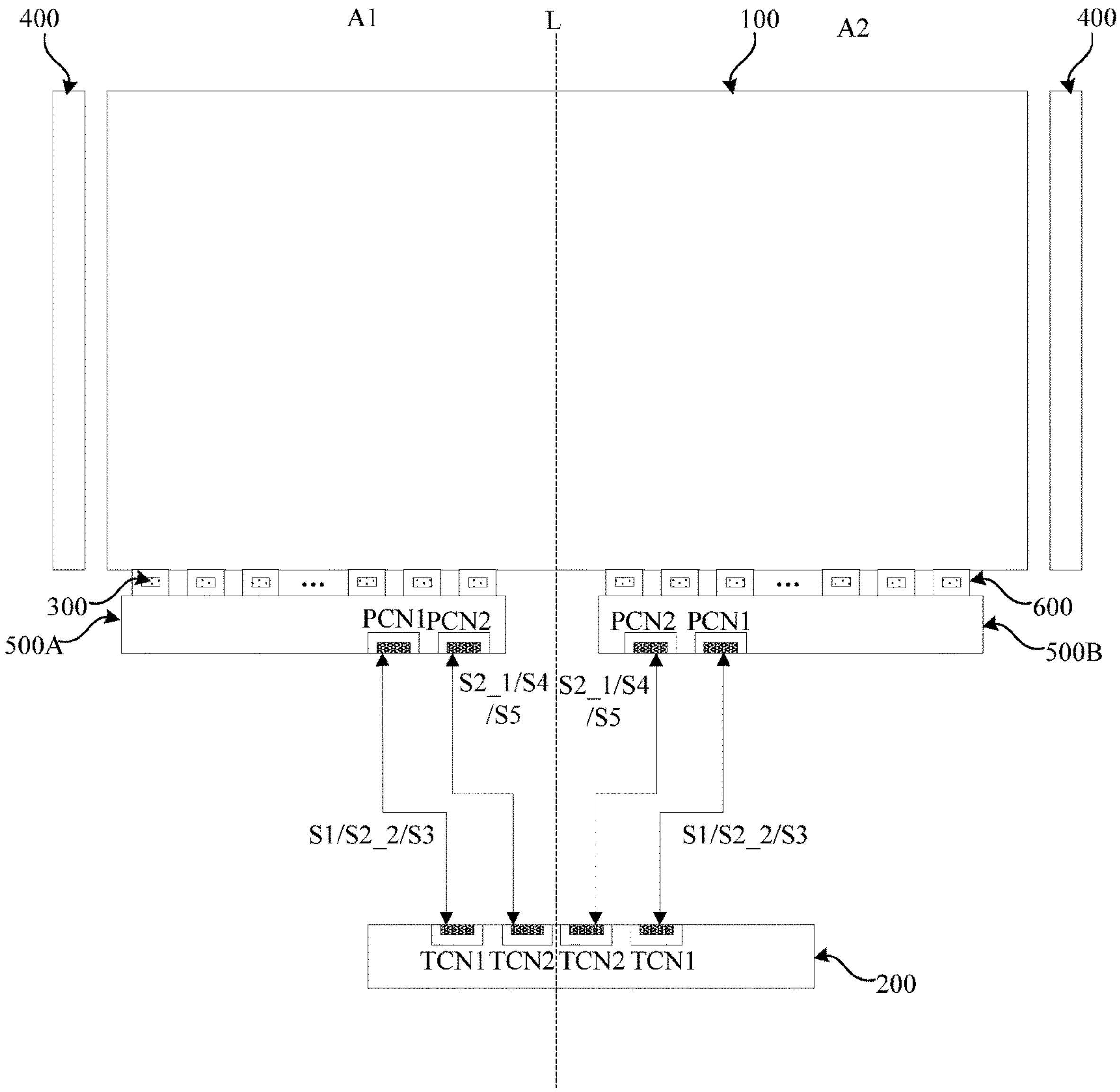
FIG. 12 is a seventh schematic diagram of the connection between the timing controller and the display panel in the display apparatus provided by an exemplary implementation.
Figure 13:
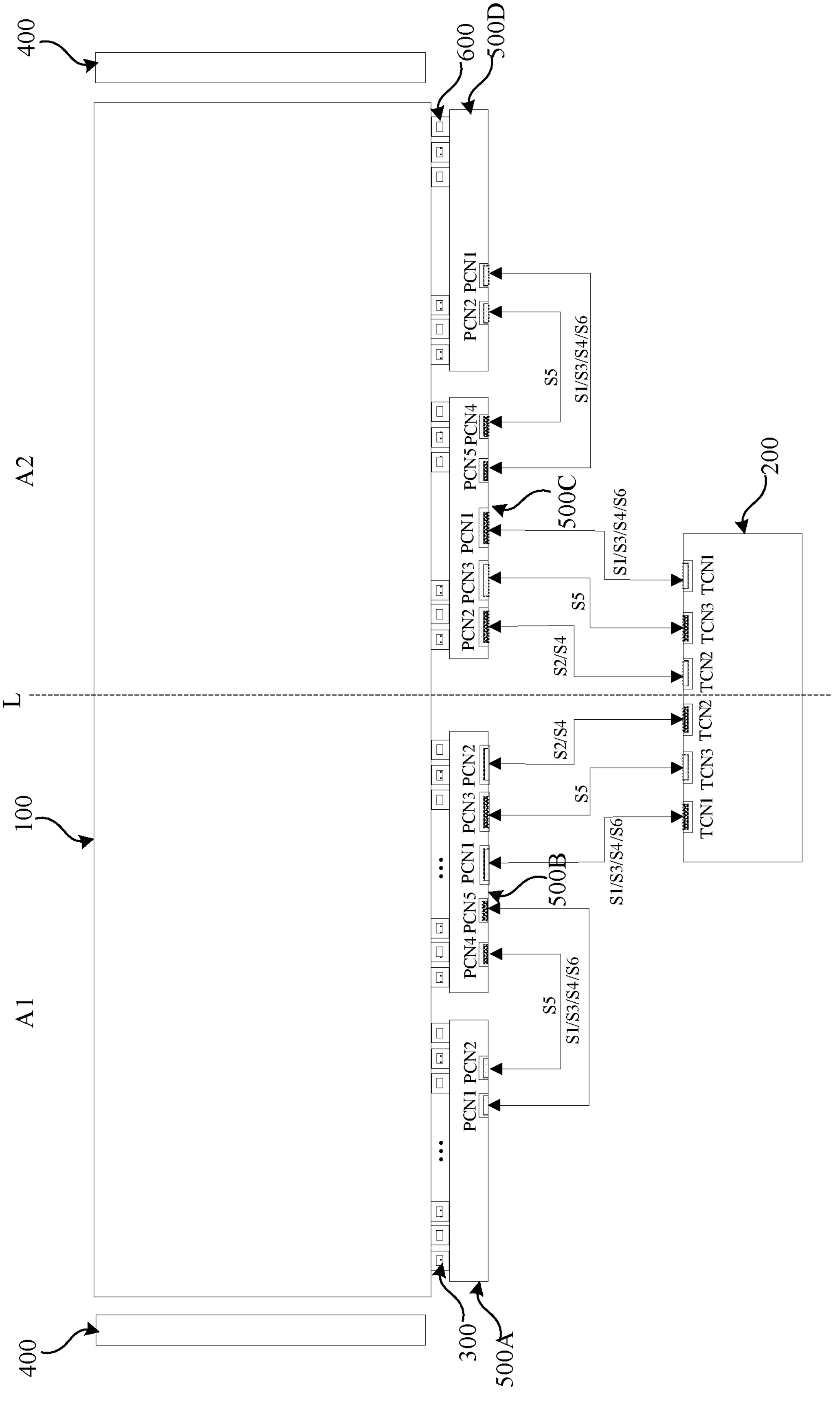
FIG. 13 is an eighth schematic diagram of the connection between the timing controller and the display panel in the display apparatus provided by an exemplary implementation.
Figure 14:
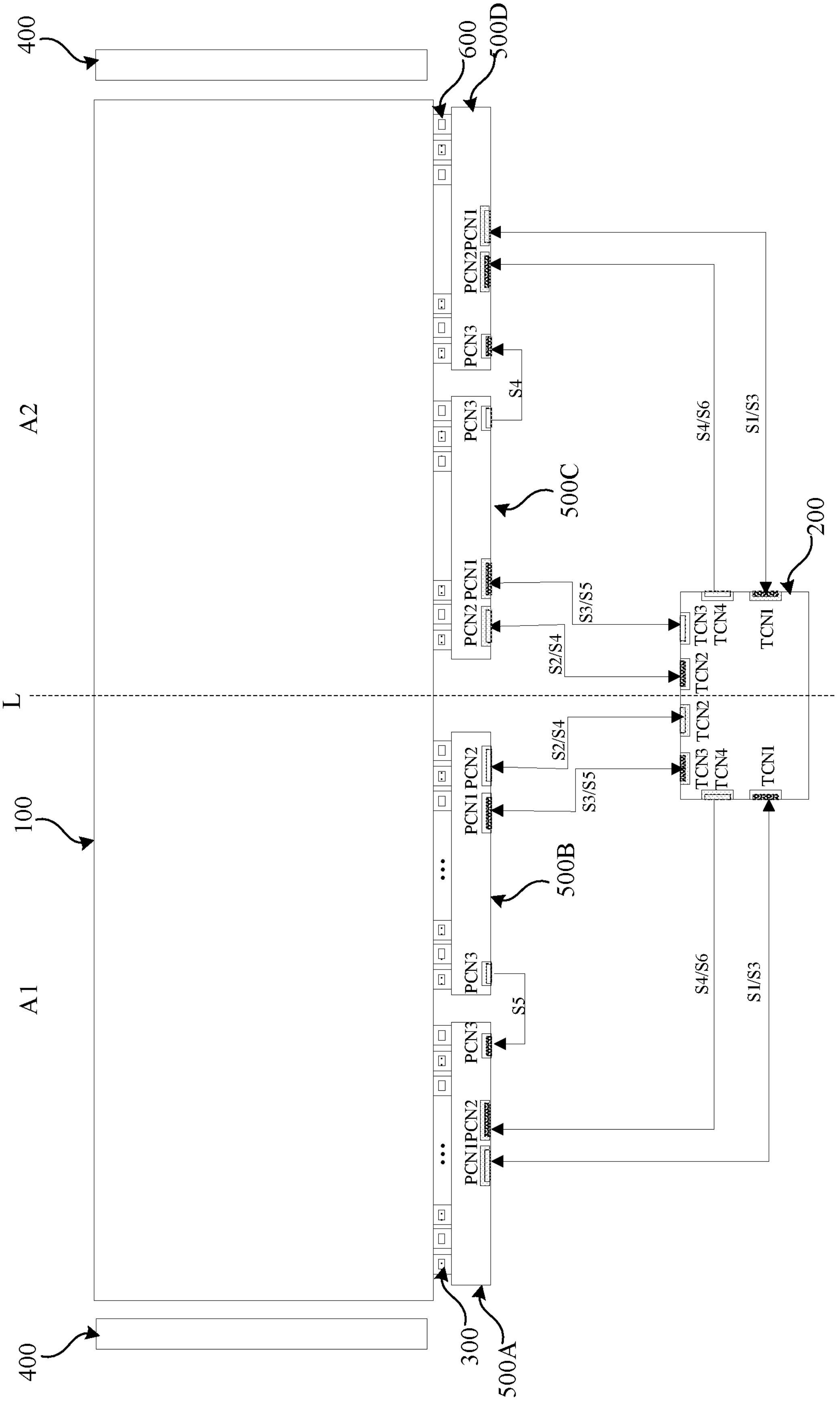
FIG. 14 is a ninth schematic diagram of the connection between the timing controller and the display panel in the display apparatus provided by an exemplary implementation.

FIG. 6 is a first schematic diagram of the connection between the timing controller and the display panel in the display apparatus provided by an exemplary implementation. FIG. 7 is a second schematic diagram of the connection between the timing controller and the display panel in the display apparatus provided by an exemplary implementation. FIG. 8 is a third schematic diagram of the connection between the timing controller and the display panel in the display apparatus provided by an exemplary implementation. FIG. 9 is a fourth schematic diagram of the connection between the timing controller and the display panel in the display apparatus provided by an exemplary implementation. FIG. 10 is a fifth schematic diagram of the connection between the timing controller and the display panel in the display apparatus provided by an exemplary implementation. FIG. 11 is a sixth schematic diagram of the connection between the timing controller and the display panel in the display apparatus provided by an exemplary implementation. FIG. 12 is a seventh schematic diagram of the connection between the timing controller and the display panel in the display apparatus provided by an exemplary implementation. FIG. 13 is an eighth schematic diagram of the connection between the timing controller and the display panel in the display apparatus provided by an exemplary implementation. FIG. 14 is a ninth schematic diagram of the connection between the timing controller and the display panel in the display apparatus provided by an exemplary implementation. As shown in FIGS. 2, 6-14, in an exemplary implementation, the display apparatus may further include at least one printed circuit board 500 and multiple flexible circuit boards 600, and a source driver 300 is located on the flexible circuit board 600 or a display panel 100. FIG. 2 is illustrated by taking a source driver located in a flexible printed circuit board as an example.

In an exemplary implementation, the printed circuit board 500 may be located between the flexible circuit board 600 and the timing controller 200 and is connected to the timing controller 200 and at least one flexible circuit board 600.

In an exemplary implementation, the flexible circuit board 600 may be located between the printed circuit board 500 and the display panel 100 and is connected to the display panel 100.

In an exemplary implementation, as shown in FIGS. 2, 6 through 14, the first timing connector TCN1 is further configured to transmit a third signal S3. The third signal S3 may include a second power supply signal configured to supply power to the display panel.

In an exemplary implementation, the second power signal supplies power to a first power line and a second power line in the display panel.

In an exemplary implementation, the third signal S3 and the first signal S1 are transmitted by the first timing connector TCN1, which can reduce the quantity of connectors in the timing controller and reduce the cost of the display apparatus.

In an exemplary implementation, as shown in FIGS. 2, 6 through 14, the second timing connector TCN2 is further configured to transmit a fourth signal S4, which may include a clock embedded differential signal protocol.

In an exemplary implementation, the fourth signal S4 and a second signal S2 are transmitted by the second timing connector TCN2, which can reduce the quantity of connectors in the timing controller and reduce the cost of the display apparatus.

In an exemplary implementation, a clock embedded differential signal protocol may transmit clock embedded differential image data. Clock embedded differential signal protocol can include three components: clock training, configuration and RGB data transmission.

In an exemplary implementation, as shown in FIGS. 2 and 6-8, when the quantity of gate drivers 400 is one, the gate drivers 400 is located in a first region A1 or a second region A2. The timing controller 200 and the gate driver 400 are located in the same region of the display apparatus. FIG. 2 and FIG. 6 to FIG. 8 illustrate that the gate driver 600 is located in the second region A2 as an example.

In an exemplary implementation, as shown in FIGS. 9 to 14, when the quantity of gate drivers 400 is two, the two gate drivers 400 are located in the first region A1 and the second region A2, respectively. At this time, the timing controller 200 is located in the first region A1 and the second region A2 and is substantially symmetrical along a centerline L of the display apparatus.

In an exemplary implementation, structure A includes two integrally formed structural components, and structure A is substantially symmetrical along a centerline L of the display apparatus, meaning that the two structural components are separately located on both sides of the centerline L of the display apparatus, and the areas of the two structural components may be the same or may be different. When the areas of the two structural component parts of the structure A are different, the difference in the areas of the structural component parts located on both sides of the centerline L of the display apparatus is smaller than the threshold area difference value. The threshold area difference is determined according to the size and structure of the display apparatus. FIG. 9 to FIG. 14 illustrate an example in which the areas of the components of the timing controller located on both sides of the centerline L of the display apparatus are identical.

In an exemplary implementation, as shown in FIGS. 2, 6 through 8, when the quantity of gate drivers 400 is one, the quantity of first timing connector TCN1 and second timing connector TCN2 in the timing controller is each one. The quantity of printed circuit boards 500 is one, and the printed circuit board 500 is substantially symmetrical along a centerline L of the display apparatus.

In an exemplary implementation, as shown in FIGS. 2, 6 through 8, the first timing connector TCN1 and the second timing connector TCN2 may be on a side of the timing controller close to the display panel. The first timing connector TCN1 and the second timing connector TCN2 may be on a side of the timing controller close to the display panel, thereby reducing wiring in the display apparatus and saving the cost of the display apparatus.

In an exemplary implementation, as shown in FIGS. 2, 6 through 8, the printed circuit board 500 includes a first circuit connector PCN1 and a second circuit connector PCN2. The first circuit connector PCN1, the second circuit connector PCN2 and the gate driver 400 are located in the same region of the display apparatus. The first timing connector TCN1 is connected to the first circuit connector PCN1, and the second timing connector TCN2 is connected to the second circuit connector PCN2.

In an exemplary implementation, the first circuit connector PCN1 may be located on a side of the second circuit connector PCN2 close to the gate driver.

In an exemplary implementation, the first circuit connector PCN1 and the second circuit connector PCN2 are located on a side of the printed circuit board 500 close to the timing controller 200.

In an exemplary implementation, the timing controller in the display apparatus shown in FIGS. 2, 6 through 8 is arranged in a manner suitable for a display apparatus having a size less than 50 inches, such as a 5-inch or 14-inch display apparatus, which is not limited in this disclosure.

In an exemplary implementation, as shown in FIGS. 9 to 14, when the quantity of gate drivers 400 is two, the quantity of first timing connectors TCN1 and second timing connectors TCN2 are both two. The two first timing connectors TCN1 are substantially symmetrical along a centerline L of the display apparatus, the two second timing connectors TCN2 are substantially symmetrical along the centerline L of the display apparatus, and the two second timing connectors TCN2 are located between the two first timing connectors TCN1.

In an exemplary implementation, the first timing connector TCN1 and the second timing connector TCN2 may be located on a side of the timing controller 200 close to the display panel 100.

In an exemplary implementation, the substantially symmetrical structure B and structure C along the centerline L of the display apparatus means that the distance between structure B and the centerline L and the distance between structure C and the centerline L may be the same or may be different. When the distance between structure B and the centerline L is different from the distance between structure C and the centerline L, the difference between the distance between structure B and the centerline L and the distance between structure C and the centerline L is less than a threshold difference value, wherein the threshold difference value is determined according to the size and the structure of the display apparatus. FIG. 9 to FIG. 14 illustrate an example in which the distance between the connectors located on both sides of the centerline L of the display apparatus and the centerline L of the display apparatus is equal.

In an exemplary implementation, as shown in FIGS. 9 to 12, when the quantity of gate drivers 400 is two, the quantity of printed circuit boards is two, the two printed circuit boards are substantially symmetrical along the centerline L of the display apparatus, and the two printed circuit boards are respectively a first printed circuit board 500A and a second printed circuit board 500B. At least one printed circuit board includes a first circuit connector PCN1 and a second circuit connector PCN2. The first printed circuit board 500A, the first first timing connector TCN1 and the first second timing connector TCN2 are located in the first region A1, and the second printed circuit board 500B, the second first timing connector TCN1, and the second second timing connector TCN2 are located in the second region A2.

In an exemplary implementation, for at least one printed circuit board, the first circuit connector PCN1 is located on a side of the second circuit connector PCN2 away from a centerline L of the display apparatus, and the first circuit connector PCN1 and the second circuit connector PCN2 are located on a side of the printed circuit board close to the timing controller 200.

In an exemplary implementation, as shown in FIGS. 9 to 12, the first circuit connector PCN1 of the first printed circuit board 500A is connected to the first first timing connector TCN1, and the second circuit connector PCN2 of the first printed circuit board 500A is connected to the first second timing connector TCN2.

In an exemplary implementation, as shown in FIGS. 9 to 12, the first circuit connector PCN1 of the second printed circuit board 500B is connected to the second first timing connector TCN1, and the second circuit connector PCN2 of the second printed circuit board 500B is connected to the second second timing connector TCN2.

In an exemplary implementation, as shown in FIGS. 7, 8, 11 and 12, for a first timing connector TCN1 and a second timing connector TCN2 located in a same region, when the amount of data that may be transmitted by the second timing connector TCN2 is less than a sum of the amount of data of a second signal and the amount of data of a fourth signal, the second timing connector TCN2 is configured to transmit a first signal segment S2_1, and the first timing connector TCN1 is configured to transmit a second signal segment S2_2; and the second signal S2 includes a first signal segment S2_1 and a second signal segment S2_2, the data amount of the first signal segment S2_1 is smaller than the data amount of the second signal segment S2_2.

In an exemplary implementation, as shown in FIGS. 2 and 6 to 12, the display panel includes multiple sub-pixels, wherein at least one sub-pixel includes a drive circuit including a drive transistor; the first timing connector TCN1 or the second timing connector TCN2 is further configured to transmit a fifth signal, which includes at least one of a gamma reference voltage signal, a third power supply signal, a compensation control signal signal, and a compensation data signal; wherein the third power supply signal is configured to supply power to the source driver, the compensation control signal is configured to control compensation for a threshold voltage and mobility of a drive transistor, and the compensation data signal is configured as a data signal for compensating for a threshold voltage and mobility of the drive transistor. FIG. 2, FIG. 7, FIG. 9, and FIG. 11 illustrate the transmission of a fifth signal by a first timing connector TCN1, and FIG. 6, FIG. 8, FIG. 10, and FIG. 12 illustrate the transmission of the fifth signal by a second timing connector TCN2.

In an exemplary implementation, the timing controller in the display apparatus shown in FIGS. 9 to 12 is arranged in a manner suitable for a display apparatus whose size is greater than 50 inches and less than 70 inches, for example, a 55 inch display apparatus, which is not limited in this disclosure.

In an exemplary implementation, as shown in FIGS. 13 and 14, the timing controller 200 further includes a third timing connector TCN3. The third timing connector TCN3 is disposed between the first timing connector TCN1 and the second timing connector TCN2.

In an exemplary implementation, as shown in FIGS. 13 and 14, the third timing connector TCN3 may be configured to transmit a fifth signal S5. Wherein, the fifth signal S5 includes at least one of a gamma reference voltage signal, a third power supply signal, a compensation control signal, and a compensation data signal; wherein the third power supply signal is configured to supply power to the source driver, the compensation control signal is configured to control compensation for a threshold voltage and mobility of a drive transistor, and the compensation data signal is configured as a data signal for compensating for a threshold voltage and mobility of the drive transistor.

In an exemplary implementation, as shown in FIG. 13, the quantity of the first timing connector TCN1, the second timing connector TCN2, and the third timing connector TCN3 is each two. Wherein the two first timing connectors TCN1 are substantially symmetrical along a centerline L of the display apparatus, two second timing connectors TCN2 are substantially symmetrical along the centerline L of the display apparatus, two third timing connectors TCN3 are substantially symmetrical along the centerline L of the display apparatus, two second timing connectors TCN2 and two third timing connectors TCN3 are located between two first timing connectors TCN1, and two second timing connectors TCN2 are located between two third timing connectors TCN3.

In an exemplary implementation, as shown in FIG. 13, a first timing connector TCN1, a second timing connector TCN2, and a third timing connector TCN3 are located on a side of the timing controller close to the display panel 100.

In one exemplary implementation, the quantity of printed circuit boards is four, and the four printed circuit boards are respectively a first printed circuit board 500A, a second printed circuit board 500B, a third printed circuit board 500C, and a fourth printed circuit board 500D.

In an exemplary implementation, as shown in FIG. 13, a first printed circuit board 500A and a second printed circuit board 500B are located in a first region A1, and a third printed circuit board 500C and a fourth printed circuit board 500D are located in a second region A2. The first printed circuit board 500A is located on a side of the second printed circuit board 500B away from the centerline L of the display apparatus, and the fourth printed circuit board 500D is located on a side of the third printed circuit board 500C away from the centerline L of the display apparatus.

In an exemplary implementation, as shown in FIG. 13, a first first timing connector TCN1, a first second timing connector TCN2, and a first third timing connector TCN3 are located in a first region A1, and a second first timing connector TCN1, a second second timing connector TCN2, and a second third timing connector TCN3 are located in a second region A2.

In an exemplary implementation, as shown in FIG. 13, for the second printed circuit board 500B and the third printed circuit board 500C, the second printed circuit board 500B and the third printed circuit board 500C include a first circuit connector PCN1, a second circuit connector PCN2 and a third circuit connector PCN3. The third circuit connector PCN3 is located between the first circuit connector PCN1 and the second circuit connector PCN2, the first circuit connector PCN1 is located on a side of the third circuit connector PCN3 away from the centerline L of the display apparatus, and the second circuit connector PCN2 is located on a side of the third circuit connector PCN3 close to the centerline L of the display apparatus.

In an exemplary implementation, as shown in FIG. 13, a first circuit connector PCN1 of the second printed circuit board 500B is connected to a first first timing connector TCN1, a second circuit connector PCN2 of the second printed circuit board 500B is connected to a first second timing connector TCN2, a third circuit connector PCN3 of the second printed circuit board 500B is connected to a first third timing connector TCN3, the first circuit connector PCN1 of the third printed circuit board 500C is connected to the second first timing connector TCN1, the second circuit connector PCN2 of the third printed circuit board 500C is connected to the second second timing connector TCN2, and the third circuit connector PCN3 of the third printed circuit board 500C is connected to the second third timing connector TCN3.

In an exemplary implementation, the second printed circuit board 500B and the third printed circuit board 500C further include a fourth circuit connector PCN4 and a fifth circuit connector PCN5; the fourth circuit connector PCN4 is located on a side of the fifth circuit connector PCN5 away from the centerline L of the display apparatus.

In an exemplary implementation, for the second printed circuit board 500B and the third printed circuit board 500C, the fourth circuit connector PCN4 transmits the same signal as the third circuit connector PCN3, and the fifth circuit connector PCN5 transmits the same signal as the first circuit connector PCN1.

In an exemplary implementation, as shown in FIG. 13, the first printed circuit board 500A and the fourth printed circuit board 500D include a first circuit connector PCN1 and a second circuit connector PCN2.

In an exemplary implementation, as shown in FIG. 13, for the first printed circuit board 500A and the fourth printed circuit board 500D, the first circuit connector PCN1 is located on a side of the second circuit connector PCN2 away from the centerline L of the display apparatus.

In an exemplary implementation, as shown in FIG. 13, a first circuit connector PCN1 of the first printed circuit board 500A is connected to a fifth circuit connector PCN5 of the second printed circuit board 500B, a second circuit connector PCN2 of the first printed circuit board 500A is connected to a fourth circuit connector PCN4 of the second printed circuit board 500B, a first circuit connector PCN1 of the fourth printed circuit board 500D is connected to a fifth circuit connector PCN5 of the third printed circuit board 500B, and a second circuit connector PCN2 of the fourth printed circuit board 500D is connected to a fourth circuit connector PCN4 of the third printed circuit board 500C.

In an exemplary implementation, a first circuit connector PCN1 of the first printed circuit board 500A is connected to a fifth circuit connector PCN5 of the second printed circuit board 500B, a second circuit connector PCN2 of the first printed circuit board 500A is connected to a fourth circuit connector PCN4 of the second printed circuit board 500B, a first circuit connector PCN1 of the fourth printed circuit board 500D is connected to a fifth circuit connector PCN5 of the third printed circuit board 500B, and a second circuit connector PCN2 of the fourth printed circuit board 500D is connected to a fourth circuit connector PCN4 of the third printed circuit board 500C, In this way, the quantity of connectors of the timing controller and the cost of the display apparatus can be reduced.

In an exemplary implementation, the first timing connector TCN1 is further configured to transmit a fourth signal and a sixth signal S6, wherein the sixth signal S6 includes a third power supply signal.

In an exemplary implementation, the timing controller in the display apparatus shown in FIG. 13 is arranged in a manner suitable for a display apparatus having a size greater than 70 inches and less than 90 inches, such as a 75-inch display apparatus, which is not limited in this disclosure.

In an exemplary implementation, as shown in FIG. 14, the timing controller 200 may further include a fourth timing connector TCN4 configured to transmit a fourth signal and a sixth signal, wherein the sixth signal includes a third power supply signal.

In an exemplary implementation, as shown in FIG. 14, the quantity of the first timing connector TCN1, the second timing connector TCN2, the third timing connector TCN3, and the fourth timing connector TCN4 is each two.

In an exemplary implementation, as shown in FIG. 14, two first timing connectors TCN1 are substantially symmetrical along a centerline L of the display apparatus, two second timing connectors TCN2 are substantially symmetrical along the centerline L of the display apparatus, two third timing connectors TCN3 are substantially symmetrical along the centerline L of the display apparatus, and two fourth timing connectors TCN4 are substantially symmetrical along the centerline L of the display apparatus.

In an exemplary implementation, as shown in FIG. 14, two second timing connectors TCN2, two third timing connectors TCN3, and two fourth timing connectors TCN4 are located between two first timing connectors TCN1, two third timing connectors TCN3 and two second timing connectors TCN2 are located between two fourth timing connectors TCN4, and two second timing connectors TCN2 are located between two third timing connectors TCN3.

In an exemplary implementation, as shown in FIG. 14, the second timing connector TCN2 and the third timing connector TCN3 are located on a side of the timing controller 200 close to the display panel 100, and the first timing connector TCN1 and the fourth timing connector TCN4 are located on the adjacent side of the surface on which the second timing connector TCN2 is located.

In one exemplary implementation, as shown in FIG. 14, the quantity of printed circuit boards is four, and the four printed circuit boards are respectively a first printed circuit board 500A, a second printed circuit board 500B, a third printed circuit board 500C, and a fourth printed circuit board 500D.

In an exemplary implementation, as shown in FIG. 14, a first printed circuit board 500A and a second printed circuit board 500B are located in a first region A1, and a third printed circuit board 500C and a fourth printed circuit board 500D are located in a second region A2. The first printed circuit board 500A is located on a side of the second printed circuit board 500B away from the centerline L of the display apparatus, and the fourth printed circuit board 500D is located on a side of the third printed circuit board 500C away from the centerline L of the display apparatus.

In an exemplary implementation, as shown in FIG. 14, the first first timing connector TCN1, the first second timing connector TCN2, the first third timing connector TCN3 and the first fourth timing connector TCN4 are located in the first region A1, and the second first timing connector TCN1, the second second timing connector TCN2, the second third timing connector TCN3 and the second fourth timing connector TCN4 are located in the second region A2.

In an exemplary implementation, as shown in FIG. 14, for at least one printed circuit board, the printed circuit board includes a first circuit connector PCN1 and a second circuit connector PCN2, wherein the first circuit connector PCN1 is located on a side of the second circuit connector PCN2 away from a centerline L of the display apparatus.

In an exemplary implementation, as shown in FIG. 14, a first circuit connector PCN1 of the first printed circuit board 500A is connected to a first first timing connector TCN1, and a second circuit connector PCN2 of the first printed circuit board 500A is connected to a first fourth timing connector TCN4.

In an exemplary implementation, as shown in FIG. 14, a first circuit connector PCN1 of the second printed circuit board 500B is connected to a first third timing connector TCN3, and a second circuit connector PCN2 of the second printed circuit board 500B is connected to a first second timing connector TCN2.

In an exemplary implementation, as shown in FIG. 14, a first circuit connector PCN1 of the third printed circuit board 500C is connected to a second first timing connector TCN1, and a second circuit connector PCN2 of the third printed circuit board 500C is connected to a second fourth timing connector TCN4.

In an exemplary implementation, as shown in FIG. 14, a first circuit connector PCN1 of the fourth printed circuit board 500D is connected to a second third timing connector TCN3, and a second circuit connector PCN2 of the fourth printed circuit board 500D is connected to a second second timing connector TCN2.

In an exemplary implementation, as shown in FIG. 14 for at least one printed circuit board, the printed circuit board further includes a third circuit connector PCN3. Wherein, the third circuit connector PCN3 in the second printed circuit board 500B and the third printed circuit board 500C is located on a side of the first circuit connector PCN1 away from the centerline L of the display apparatus. The third circuit connector PCN3 in the first printed circuit board 500A and the fourth printed circuit board 500D is located on a side of the second circuit connector PCN2 close to the centerline L of the display apparatus.

In an exemplary implementation, as shown in FIG. 14, a third circuit connector PCN3 of the first printed circuit board 500A is connected to a third circuit connector PCN3 of the second printed circuit board 500B; a third circuit connector PCN3 of the third printed circuit board 500C is connected to a third circuit connector PCN3 of the fourth printed circuit board 500D.

In an exemplary implementation, the third circuit connector PCN3 of the first printed circuit board 500A is connected to the third circuit connector PCN3 of the second printed circuit board 500B, and the third circuit connector PCN3 of the third printed circuit board 500C is connected to the third circuit connector PCN3 of the fourth printed circuit board 500D. In this way, the quantity of connectors of the timing controller and the cost of the display apparatus can be reduced.

In an exemplary implementation, as shown in FIG. 14, a third circuit connector PCN3 is configured to transmit a fifth signal.

In an exemplary implementation, as shown in FIG. 14, the third timing connector TCN3 is further configured to transmit a second signal.

In an exemplary implementation, the timing controller in the display apparatus shown in FIG. 14 is arranged in a manner suitable for a display apparatus having a size greater than 90 inches, such as a 95 inch display apparatus, which is not limited in this disclosure.

The accompanying drawings of the present disclosure only involve the structures involved in the implementations of the present disclosure, and other structures may refer to usual designs.

For the sake of clarity, in the accompanying drawings used for describing the implementations of the present disclosure, a thickness and dimension of a layer or a micro structure is enlarged. It may be understood that when an element such as a layer, a film, a region, or a substrate is described as being "on" or "under" another element, the element may be "directly" located "on" or "under" the other element, or there may be an intermediate element.

Although the implementations disclosed in the present disclosure are as above, the described contents are only implementations used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A display apparatus comprising: a display panel, a timing controller, a source driver and one or more gate drivers; the display panel comprising: a first boundary and a second boundary which are oppositely disposed and a third boundary and a fourth boundary which are oppositely disposed, the one or more gate drivers located on a side of the first boundary away from the second boundary and/or on a side of the second boundary away from the first boundary, the source driver located on a side of the third boundary away from the fourth boundary or on a side of the fourth boundary away from the third boundary, the display apparatus divided into a first region and a second region along a centerline of the display apparatus, and the centerline of the display apparatus extending in a same direction as an extension of the first boundary and intersecting an extension of the third boundary;

the timing controller comprising one or more first timing connectors and one or more second timing connectors, wherein the one or more first timing connectors, the one or more second timing connectors and the one or more gate drivers are located in a same region, and the one or more first timing connectors are located closer to the one or more gate drivers than the one or more second timing connectors;

the one or more first timing connectors configured to transmit a first signal, the one or more second timing connectors configured to transmit a second signal, the first signal comprising: a first power supply signal and a first control signal, the first power supply signal configured to supply power to the one or more gate drivers, the first control signal configured to control the one or more gate drivers to output a scan signal, and the second signal comprising a second control signal, which is configured to control the source driver to output a data signal, wherein the second timing connector is further configured to transmit a fourth signal, which comprises a clock embedded differential signal protocol, wherein when a quantity of gate drivers is two, the two gate drivers are respectively located in the first region and the second region; and the timing controller located in the first region and the second region and symmetrical along the centerline of the display apparatus, wherein the timing controller further comprises one or more third timing connectors, which is disposed between the first timing connector and the second timing connector;

the one or more third timing connectors configured to transmit a fifth signal, which comprises at least one of a gamma reference voltage signal, a third power supply signal, a compensation control signal, and a compensation data signal; wherein the third power supply signal is configured to supply power to the source driver, the compensation control signal is configured to control compensation for a threshold voltage and mobility of a drive transistor, and the compensation data signal is configured as a data signal for compensating for a threshold voltage and mobility of the drive transistor.

2. The display device according to claim 1, further comprising: at least one printed circuit board and a plurality of flexible circuit boards, wherein the source driver is located on a flexible circuit board or the display panel;

a printed circuit board located between the flexible circuit board and the timing controller and connected to the timing controller and at least one flexible circuit board;

the flexible circuit board located between the printed circuit board and the display panel and connected to the display panel.

3. The display apparatus according to claim 2, wherein the first timing connector is further configured to transmit a third signal, which comprises a second power supply signal configured to supply power to the display panel.

4. The display apparatus according to claim 1, wherein when a quantity of gate drivers is one, the gate driver is located in the first region or the second region; and the timing controller and the gate driver located in a same region of the display apparatus.

5. The display apparatus according to claim 4, wherein a quantity of the first timing connector and the second timing connector are both one; and the first timing connector and the second timing connector located on a side of the timing controller facing the display panel.

6. The display apparatus according to claim 5, wherein a quantity of printed circuit boards is one, and the printed circuit board is symmetrical along the centerline of the display apparatus;

the printed circuit board comprising a first circuit connector and a second circuit connector, wherein the first circuit connector, the second circuit connector and the gate driver are located in a same region of the display apparatus, and the first circuit connector is located on a side of the second circuit connector facing the gate driver;

the first circuit connector and the second circuit connector located on a side of the printed circuit board facing the timing controller; and the first timing connector connected to the first circuit connector, and the second timing connector connected to the second circuit connector.

7. The display apparatus according to claim 6, wherein, for a first timing connector and a second timing connector located in a same region, when an amount of transmittable data by the second timing connector is less than a sum of an amount of data of a second signal and an amount of data of a fourth signal, the second timing connector is configured to transmit a first signal segment, and the first timing connector is configured to transmit a second signal segment; and the second signal comprising the first signal segment and the second signal segment, data amount of the first signal segment less than data amount of the second signal segment; or the display panel comprising a plurality of sub-pixels, wherein at least one sub-pixel comprises a drive circuit comprising a drive transistor; and the first timing connector or the second timing connector further configured to transmit a fifth signal, which comprises at least one of a gamma reference voltage signal, a third power supply signal, a compensation control signal, and a compensation data signal; wherein the third power supply signal is configured to supply power to the source driver, the compensation control signal is configured to control compensation for a threshold voltage and mobility of a drive transistor, and the compensation data signal is configured as a data signal for compensating for the threshold voltage and mobility of the drive transistor.

8. The display apparatus according to claim 1, wherein a quantity of the first timing connectors and the second timing connectors are both two;

two first timing connectors symmetrical along the centerline of the display apparatus, two second timing connectors symmetrical along the centerline of the display apparatus, and two second timing connectors located between the two first timing connectors; and the first timing connectors and the second timing connectors located on a side of the timing controller facing the display panel.

9. The display apparatus according to claim 8, wherein a quantity of printed circuit boards is two, the two printed circuit boards are symmetrical along a centerline of the display apparatus, and the two printed circuit boards are respectively a first printed circuit board and a second printed circuit board; at least one printed circuit board comprising a first circuit connector and a second circuit connector;

a first printed circuit board, a first first timing connector and a first second timing connector located in the first region, and a second printed circuit board, a second first timing connector and a second second timing connector located in the second region;

for at least one printed circuit board, the first circuit connector located on a side of the second circuit connector away from the centerline of the display apparatus, the first circuit connector and the second circuit connector located on a side of the printed circuit board facing the timing controller;

a first circuit connector of a first printed circuit board connected to a first first timing connector, a second circuit connector of a first printed circuit board connected to a first second timing connector, a first circuit connector of a second printed circuit board connected to a second first timing connector, and a second circuit connector of a second printed circuit board connected to a second second timing connector.

10. The display apparatus according to claim 1, wherein a quantity of the first timing connector, the second timing connector, and the third timing connector is each two;

two first timing connectors symmetrical along the centerline of the display apparatus, two second timing connectors symmetrical along the centerline of the display apparatus, two third timing connectors symmetrical along the centerline of the display apparatus, two second timing connectors and two third timing connectors located between the two first timing connectors, and two second timing connectors located between the two third timing connectors; and the first timing connectors, the second timing connectors, and the third timing connectors located on a side of the timing controller facing the display panel.

11. The display apparatus according to claim 10, wherein a quantity of printed circuit boards is four, and the four printed circuit boards are respectively a first printed circuit board, a second printed circuit board, a third printed circuit board, and a fourth printed circuit board;

the first printed circuit board and the second printed circuit board located in the first region, and the third printed circuit board and the fourth printed circuit board located in the second region; the first printed circuit board located on a side of the second printed circuit board away from the centerline of the display apparatus, and the fourth printed circuit board located on a side of the third printed circuit board away from the centerline of the display apparatus;

a first first timing connector, a first second timing connector and a first third timing connector located in the first region, and a second first timing connector, a second second timing connector and a second third timing connector located in the second region;

for a second printed circuit board and a third printed circuit board, the second printed circuit board and the third printed circuit board comprising: a first circuit connector, a second circuit connector, and a third circuit connector, wherein the third circuit connector is located between the first circuit connector and the second circuit connector, the first circuit connector is located on a side of the third circuit connector away from the centerline of the display apparatus, and the second circuit connector is located on a side of the third circuit connector facing the centerline of the display apparatus;

a first circuit connector of the second printed circuit board connected to a first first timing connector, a second circuit connector of the second printed circuit board connected to a first second timing connector, a third circuit connector of the second printed circuit board connected to a first third timing connector, a first circuit connector of the third printed circuit board connected to a second first timing connector, a second circuit connector of the third printed circuit board connected to a second second timing connector, and a third circuit connector of the third printed circuit board connected to a second third timing connector.

12. The display apparatus according to claim 11, wherein the second printed circuit board and the third printed circuit board further comprise a fourth circuit connector and a fifth circuit connector; the fourth circuit connector located on a side of the fifth circuit connector away from the centerline of the display apparatus;

the fourth circuit connector transmitting a same signal as the third circuit connector, and the fifth circuit connector transmitting a same signal as the first circuit connector;

the first printed circuit board and the fourth printed circuit board comprising a first circuit connector and a second circuit connector;

for the first printed circuit board and the fourth printed circuit board, the first circuit connector located on a side of the second circuit connector away from the centerline of the display apparatus;

a first circuit connector of the first printed circuit board connected to a fifth circuit connector of the second printed circuit board, a second circuit connector of the first printed circuit board connected to a fourth circuit connector of the second printed circuit board, a first circuit connector of the fourth printed circuit board connected to a fifth circuit connector of the third printed circuit board, and a second circuit connector of the fourth printed circuit board connected to a fourth circuit connector of the third printed circuit board, wherein the first timing connector is further configured to transmit a fourth signal and a sixth signal, wherein the sixth signal comprises a third power supply signal.

13. The display apparatus according to claim 11, wherein for at least one printed circuit board, the printed circuit board further comprises a third circuit connector;

the third circuit connectors in the second printed circuit board and the third printed circuit board located on a side of the first circuit connector away from the centerline of the display apparatus;

the third circuit connectors in the first printed circuit board and the fourth printed circuit board located on a side of the second circuit connector facing the centerline of the display apparatus;

a third circuit connector of the first printed circuit board connected to a third circuit connector of the second printed circuit board; and a third circuit connector of the third printed circuit board connected to a third circuit connector of the fourth printed circuit board.

14. The display apparatus according to claim 13, wherein the third circuit connector is configured to transmit a fifth signal;

or wherein the third timing connector is further configured to transmit a third signal.

15. The display apparatus according to claim 1, wherein the timing controller further comprises a fourth timing connector configured to transmit a fourth signal and a sixth signal, wherein the sixth signal comprises a third power supply signal.

16. The display apparatus according to claim 15, wherein a quantity of the first timing connector, the second timing connector, the third timing connector, and the fourth timing connector is each two;

two first timing connectors symmetrical along the centerline of the display apparatus, two second timing connectors symmetrical along the centerline of the display apparatus, two third timing connectors symmetrical along the centerline of the display apparatus, and two fourth timing connectors symmetrical along the centerline of the display apparatus; two second timing connectors, two third timing connectors and two fourth timing connectors located between the two first timing connectors, two third timing connectors and two second timing connectors located between the two fourth timing connectors, and two second timing connectors located between the two third timing connectors;

the second timing connector and the third timing connector located on a side of the timing controller facing the display panel, and the first timing connector and the fourth timing connector located on adjacent sides of a surface on which the second timing connector is located.

17. The display apparatus according to claim 16, wherein a quantity of printed circuit boards is four, and the four printed circuit boards are respectively a first printed circuit board, a second printed circuit board, a third printed circuit board, and a fourth printed circuit board;

the first printed circuit board and the second printed circuit board located in the first region, and the third printed circuit board and the fourth printed circuit board located in the second region; the first printed circuit board located on a side of the second printed circuit board away from the centerline of the display apparatus, and the fourth printed circuit board located on a side of the third printed circuit board away from the centerline of the display apparatus;

a first first timing connector, a first second timing connector, a first third timing connector and a first fourth timing connector located in the first region, and a second first timing connector, a second second timing connector, a second third timing connector and a second fourth timing connector located in the second region;

for at least one printed circuit board, the printed circuit board comprising a first circuit connector and a second circuit connector, the first circuit connector located on a side of the second circuit connector away from the centerline of the display apparatus;

a first circuit connector of the first printed circuit board connected to a first first timing connector, and a second circuit connector of the first printed circuit board connected to a first fourth timing connector;

a first circuit connector of the second printed circuit board connected to a first third timing connector, and a second circuit connector of the second printed circuit board connected to a first second timing connector;

a first circuit connector of the third printed circuit board connected to a second first timing connector, and a second circuit connector of the third printed circuit board connected to a second fourth timing connector;

a first circuit connector of the fourth printed circuit board connected to a second third timing connector, and a second circuit connector of the fourth printed circuit board is connected to a second second timing connector.

* * * * *